US012573285B2

(12) United States Patent 
Nakaminami et al.

(10) Patent No.: US 12,573,285 B2 
(45) Date of Patent: Mar. 10, 2026

(54) ALERT DEVICE, METHOD, AND SYSTEM

(71) Applicant: Panasonic Intellectual Property Management Co., Ltd., Osaka (JP)

(72) Inventors: Yoshihiro Nakaminami, Osaka (JP); Daijiroh Ichimura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 121 days.

(21) Appl. No.: 18/422,364

(22) Filed: Jan. 25, 2024

(65) Prior Publication Data

US 2024/0185702 A1 Jun. 6, 2024

Related U.S. Application Data

(63) Continuation of application No. PCT/JP2022/021529, filed on May 26, 2022.

(30) Foreign Application Priority Data

Jul. 29, 2021 (JP) ................................. 2021-124660

(51) Int. Cl. 
*G08B 21/18* (2006.01) 
*G01S 5/00* (2006.01) 
*G08B 27/00* (2006.01)

(52) U.S. Cl. 
CPC .......... *G08B 21/187* (2013.01); *G01S 5/0018* (2013.01); *G08B 27/005* (2013.01)

(58) Field of Classification Search 
CPC .... G05B 23/027; G08B 27/00; G08B 21/182; G08B 25/016; G08B 25/006; G08B 26/00 
See application file for complete search history.

(56) References Cited

U.S. PATENT DOCUMENTS

| | | | |
|---|---|---|---|
| 11,894,129 B1 * | 2/2024 | Dunstan | ................. G16H 50/20 |
| 2015/0002292 A1 * | 1/2015 | Cavalcanti | ......... G08B 21/0275 |
| | | | 340/539.12 |

(Continued)

FOREIGN PATENT DOCUMENTS

| | | |
|---|---|---|
| JP | 2009-5026 | 1/2009 |
| JP | 2009-22590 | 2/2009 |

(Continued)

OTHER PUBLICATIONS

International Search Report issued Aug. 30, 2022 in International (PCT) Application No. PCT/JP2022/021529.

(Continued)

*Primary Examiner* — Mirza F Alam 
(74) *Attorney, Agent, or Firm* — Wenderoth, Lind & Ponack, L.L.P.

(57) ABSTRACT

An alert device for alerting an irregularity in equipment installed in an environment to users, including: a communication interface performing data communication with terminal devices respectively associated with the users; a controller controlling the communication interface; a state information obtainer acquiring state information indicating a state of the equipment; and a position information obtainer acquiring position information indicating a position of each user in the environment, wherein the controller: upon specifying that the equipment is in an irregular state based on the state information, transmits an irregularity notification, indicating that the equipment is in the irregular state, to the terminal devices; then detects a moving user to the irregular equipment based on the position information; and when the moving user is detected, transmits a cancellation notification indicating cancellation of the irregularity notification to a part or all of the terminal devices to which the irregularity notification is transmitted.

16 Claims, 16 Drawing Sheets

1

(56) References Cited

U.S. PATENT DOCUMENTS

| | | | |
|---|---|---|---|
| 2016/0125280 A1 | 5/2016 | Umezawa | |
| 2016/0379473 A1* | 12/2016 | Bharti .................. | G08B 21/182 |
| | | | 340/539.11 |
| 2017/0249577 A1 | 8/2017 | Nishikawa | |
| 2019/0035257 A1* | 1/2019 | Nepo .................. | G08B 15/004 |
| 2022/0172599 A1* | 6/2022 | Mehta .................. | G08B 25/006 |

FOREIGN PATENT DOCUMENTS

| | | |
|---|---|---|
| JP | 2010-111444 | 5/2010 |
| JP | 2010-182269 | 8/2010 |
| JP | 2014-123165 | 7/2014 |
| JP | 2016-87804 | 5/2016 |
| JP | 2017-156882 | 9/2017 |
| JP | 2018-67098 | 4/2018 |

OTHER PUBLICATIONS

English translation of International Search Report issued Jan. 18, 2024 in International (PCT) Application No. PCT/JP2022/021529.
Extended European Search Report issued May 15, 2024 in European Patent Application No. 22849013.2.
English translation of International Preliminary Report on Patentability issued Jan. 18, 2024 in International (PCT) Application No. PCT/JP2022/021529.

* cited by examiner

FAILURE

ERROR E01OCCURRING
AT EQUIPMENT A2

ERROR E01OCCURRING
AT EQUIPMENT A2
→RESPONDER COMING

FAILURE UNRESOLVED

ERROR E01OCCURRING
AT EQUIPMENT A2
→RESPONDER COMING
→RESPONDER NOT
ARRIVED

| QUALIFICATION INFORMATION | | |
|---|---|---|
| OPERATOR | EQUIPMENT 1 | EQUIPMENT 2 |
| W1 | NOT QUALIFIED | QUALIFIED |
| W2 | NOT QUALIFIED | NOT QUALIFIED |
| W3 | QUALIFIED | QUALIFIED |

Figure 16:
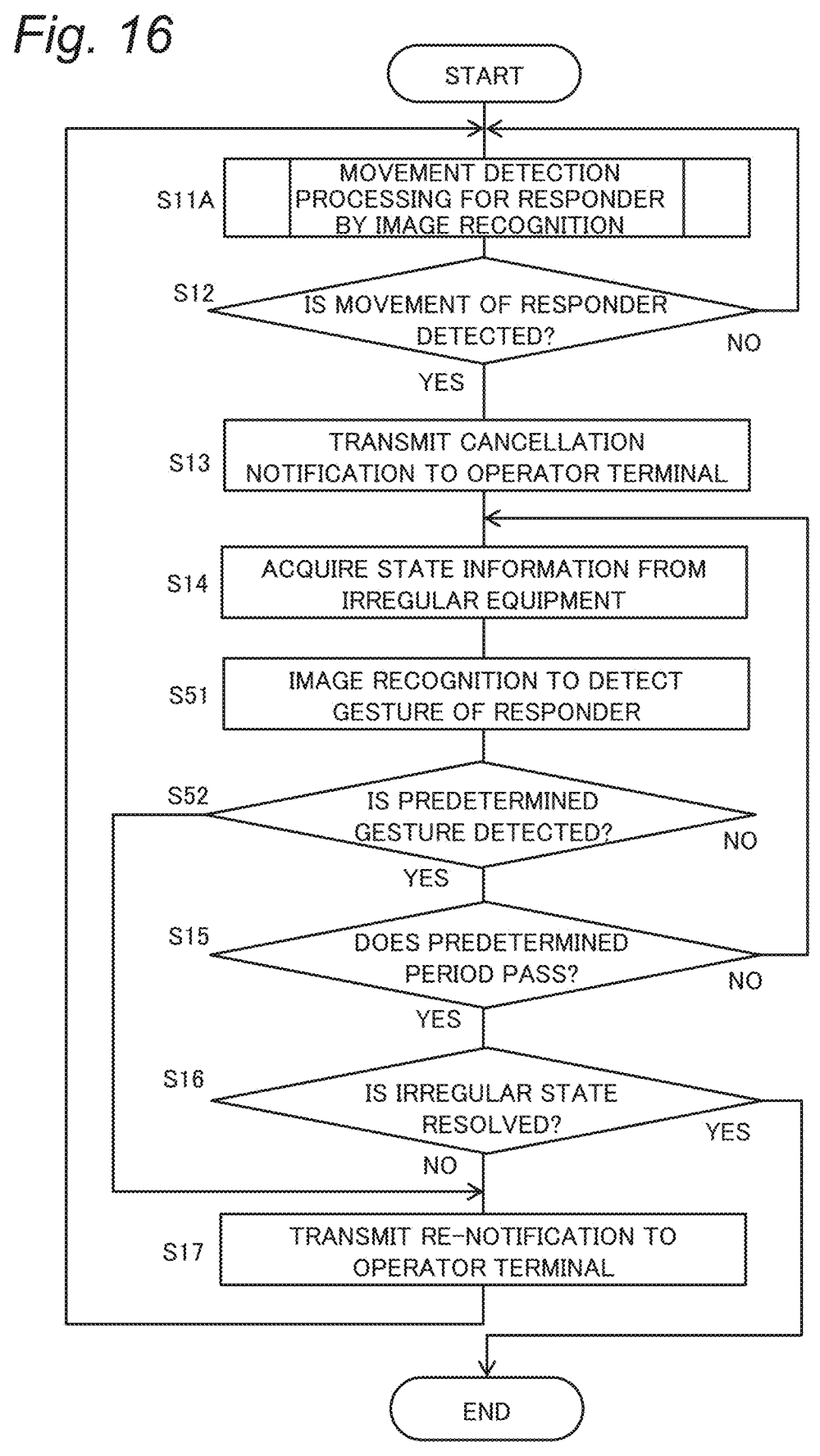

START

S11A — MOVEMENT DETECTION PROCESSING FOR RESPONDER BY IMAGE RECOGNITION

S12 — IS MOVEMENT OF RESPONDER DETECTED?

NO

YES

S13 — TRANSMIT CANCELLATION NOTIFICATION TO OPERATOR TERMINAL

S14 — ACQUIRE STATE INFORMATION FROM IRREGULAR EQUIPMENT

S51 — IMAGE RECOGNITION TO DETECT GESTURE OF RESPONDER

S52 — IS PREDETERMINED GESTURE DETECTED?

NO

YES

S15 — DOES PREDETERMINED PERIOD PASS?

NO

YES

S16 — IS IRREGULAR STATE RESOLVED?

YES

NO

S17 — TRANSMIT RE-NOTIFICATION TO OPERATOR TERMINAL

END

ALERT DEVICE, METHOD, AND SYSTEM

TECHNICAL FIELD

The present disclosure relates to an alert device, method, and system.

BACKGROUND ART

Patent Document 1 discloses a work management system including: a work management server that manages various types of work occurring in real time and supports an assignment of the work; and a sales terminal possessed by each employee. The work management server transmits, to each sales terminal, work request information for requesting a registered work to an employee and receives response information by a response operation from the employee by the sales terminal. Upon notifying the assignment of the work to the sales terminal that first responds, the work management server notifies the cancellation of the work request to the other sales terminals. As a result, the work management server in Patent Document 1 attempts to fairly and efficiently assign work.

PATENT DOCUMENTS

Patent Document 1: JP 2017-156882 A

SUMMARY

The present disclosure provides an alert device, method, and system that enable a plurality of operators to efficiently handle an irregularity in equipment.

An alert device according to an aspect of the present disclosure alerts an irregularity in equipment installed in an environment to a plurality of users. The alert device includes a communication interface, a controller, a state information obtainer, and a position information obtainer. The communication interface performs data communication with a plurality of terminal devices respectively associated with a plurality of users. The controller controls the operation of the communication interface to transmit and receive information. The state information obtainer acquires state information indicating a state of equipment. The position information obtainer acquires position information indicating the position of each user in the environment. Upon specifying that the equipment is in an irregular state based on the state information, the controller transmits an irregularity notification to the plurality of terminal devices, the irregularity notification indicating that the equipment is in the irregular state. After transmitting the irregularity notification, the controller detects a moving user to the equipment in the irregular state among the plurality of users based on the position information. When the moving user is detected, the controller transmits a cancellation notification indicating the cancellation of the irregularity notification to a part or all of the plurality of terminal devices to which the irregularity notification is transmitted.

These general and specific aspects may be implemented by a system, a method, and a computer program, and combinations of them.

According to the alert device, method, and system according to the present disclosure, it is possible to efficiently handle an irregularity in equipment by a plurality of operators.

BRIEF DESCRIPTION OF DRAWINGS

FIGS. 6A and 6B are diagrams illustrating a display example of a notification in the operator terminal of the alert system;

FIG. 9 is a diagram illustrating a display example of a re-notification in the operator terminal;

FIG. 11 is a diagram illustrating a data structure of qualification information in the alert system according to a second embodiment;

FIG. 16 is a flowchart illustrating an operation when the irregularity is detected in the alert system according to the fourth embodiment.

DETAILED DESCRIPTION

Embodiments will be described in detail below with reference to the accompanying drawings as appropriate. However, detailed descriptions more than necessary may be omitted. For example, detailed description of an already well-known matter and a duplicate description of substantially the same configuration may be omitted. This is to avoid unnecessary redundancy of the following description and to facilitate the understanding of those skilled in the art.

It should be noted that the applicant provides the accompanying drawings and the following description in order to allow those skilled in the art to fully understand the present disclosure and does not intend to make them limit the subject matter described in the claims.

First Embodiment

1. Configuration

Figure 1:
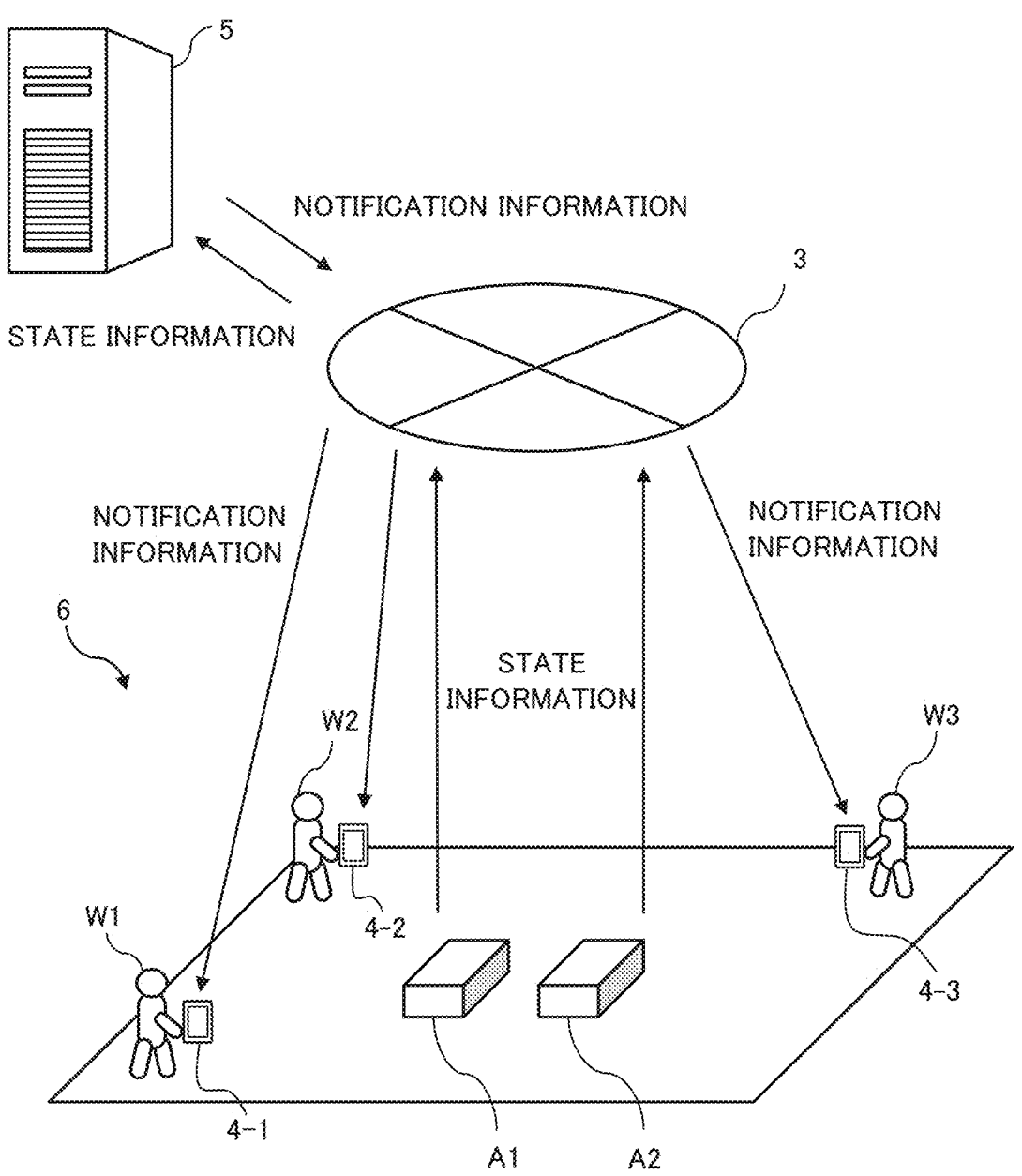
FIG. 1 is a diagram for explaining an alert system according to a first embodiment.

An alert system according to the first embodiment will be described with reference to FIG. 1. FIG. 1 is a diagram illustrating an outline of an alert system 1 according to the present embodiment.

1-1. System Overview

For example, as illustrated in FIG. 1, the alert system 1 according to the present embodiment includes operator terminals 4-1, 4-2, and 4-3 and a notification server 5. In the system 1, the operator terminal 4 and the notification server 5 are configured to be communicable via a communication network 3 such as the Internet.

The system 1 is an example of an alert system that alerts an irregularity in pieces of installed equipment A1, A2 and the like in a workplace 6 such as a factory, to operators W1, W2, W3 and the like. In the system 1, the operator terminals 4-1 to 4-3 are managed in association with the operators W1 to W3, respectively, for example. The notification server 5 is provided to be able to perform data communication with each of the pieces of equipment A1 and A2, and collects state information indicating an operating state of each of the pieces of equipment A1 and A2, for example. In the system 1, when an irregularity occurs in any of the pieces of equipment A1 and A2 in the workplace 6, notification information notifying the irregularity is transmitted from the notification server 5 to the operator terminal 4. The operators W1 to W3 can deal with the irregularity in the workplace 6 in real time by the notification information received in each of the operator terminals 4-1 to 4-3. Although FIG. 1 illustrates the two pieces of equipment A1 and A2, the number of pieces of equipment included in the system 1 is not particularly limited to two and may be one or three or more.

Hereinafter, the operator terminals 4-1, 4-2, and 4-3 are also collectively referred to as an operator terminal 4. The operators W1 to W3 are also collectively referred to as an operator W. The operator terminal 4 is an example of a terminal device in the present embodiment, and the notification server 5 is an example of the alert device in the present embodiment.

Specific configurations of the operator terminal 4 and the notification server 5 in the system 1 will be described with reference to FIGS. 2 and 3.

1-2. Configuration of Operator Terminal

Figure 2:
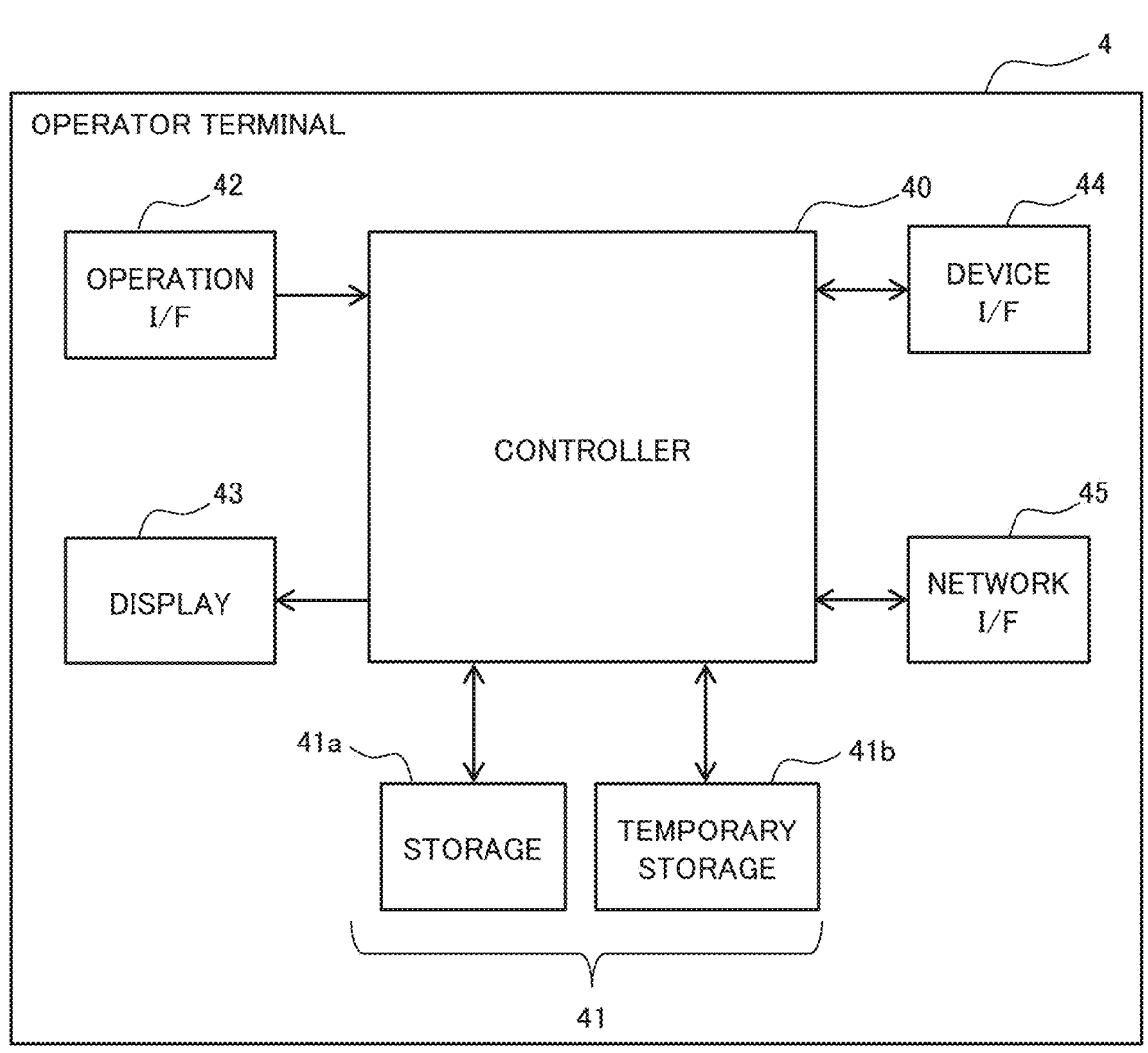
FIG. 2 is a block diagram illustrating the configuration of an operator terminal according to the first embodiment.

FIG. 2 is a block diagram exemplarily illustrating the configuration of the operator terminal 4. The operator terminal 4 is implemented by an information processing device such as a smartphone or a tablet terminal. The operator terminal 4 illustrated in FIG. 2 includes a controller 40, a memory 41, an operation interface 42, a display 43, a device interface 44, and a network interface 45. The interface will be abbreviated as "I/F" below.

The controller 40 includes a CPU or MPU that implements a predetermined function in cooperation with software, for example. The controller 40 controls the overall operation of the operator terminal 4, for example. The controller 40 performs, reading out data and programs stored in the memory 41, a variety of arithmetic processing to implement various functions. The above program may be provided from a communication network such as Internet or may be stored in a portable recording medium. The controller 40 may include various semiconductor integrated circuits such as a GPU. The controller 40 is an example of a terminal controller in the present embodiment.

The memory 41 is a storage medium that stores programs and data necessary for implementing the functions of the operator terminal 4. As illustrated in FIG. 2, the memory 41 includes a storage 41a and a temporary storage 41b.

The storage 41a stores parameters, data, a control program, and the like for implementing a predetermined function. The storage 41a is configured by an HDD or SSD, for example. For example, the storage 41a stores the above-described program and the like. The temporary storage 41b is configured by a RAM such as DRAM or SRAM and temporarily stores (i.e., holds) data, for example. The temporary storage 41b may function as a work area of the controller 40 or may be configured by a storage area in the internal memory of the controller 40.

The operation I/F 42 is a general term for operation members operated by a user. The operation I/F 42 may form a touch panel together with the display 43. The operation I/F 42 is not limited to the touch panel and may be a keyboard, a touch pad, buttons, or switches, for example. The operation I/F 42 is an example of an input interface that acquires information in accordance with a user operation.

The display 43 is an example of an output interface configured by a liquid crystal display or organic EL display, for example. The display 43 displays the notification information received from the notification server 5. The display 43 may display various types of information such as various icons for operating the operation I/F 42 and information input from the operation I/F 42.

The device I/F 44 is a circuit connecting an external device to the operator terminal 4. The device I/F 44 performs communication in accordance with predetermined communication standards. The predetermined communication standards include USB, HDMI (registered trademark), IEEE1394, WiFi (registered trademark), and Bluetooth (registered trademark). The device I/F 44 may constitute, in the operator terminal 4, an acquisition interface that receives various types of information from an external device, or an output interface that transmits various types of information to an external device. The device I/F 44 may communicate with a beacon transmitter by Bluetooth or the like, for example. In the operator terminal 4, the device I/F 44 may constitute a communication interface connected to an external device via the communication network 3.

The network I/F 45 is a circuit connecting the operator terminal 4 to the communication network 3 via a wireless or wired communication line. The network I/F 45 performs communication conforming to predetermined communication standards. The predetermined communication standards include IEEE802.3, IEEE802.11a/11b/11g/11ac, and the like. The network I/F 45 is an example of a terminal communication interface in the present embodiment and is connected to the notification server 5 via the communication network 3, for example. For example, the network I/F 45 transmits position information indicating, as a position of each operator W in the workplace 6, a position of the corresponding operator terminal 4 to the notification server 5. The network I/F 45 may configure an acquisition interface receiving various information or an output interface transmitting various information in the operator terminal 4 via the communication network 3.

1-3. Configuration of Notification Server

Figure 3:
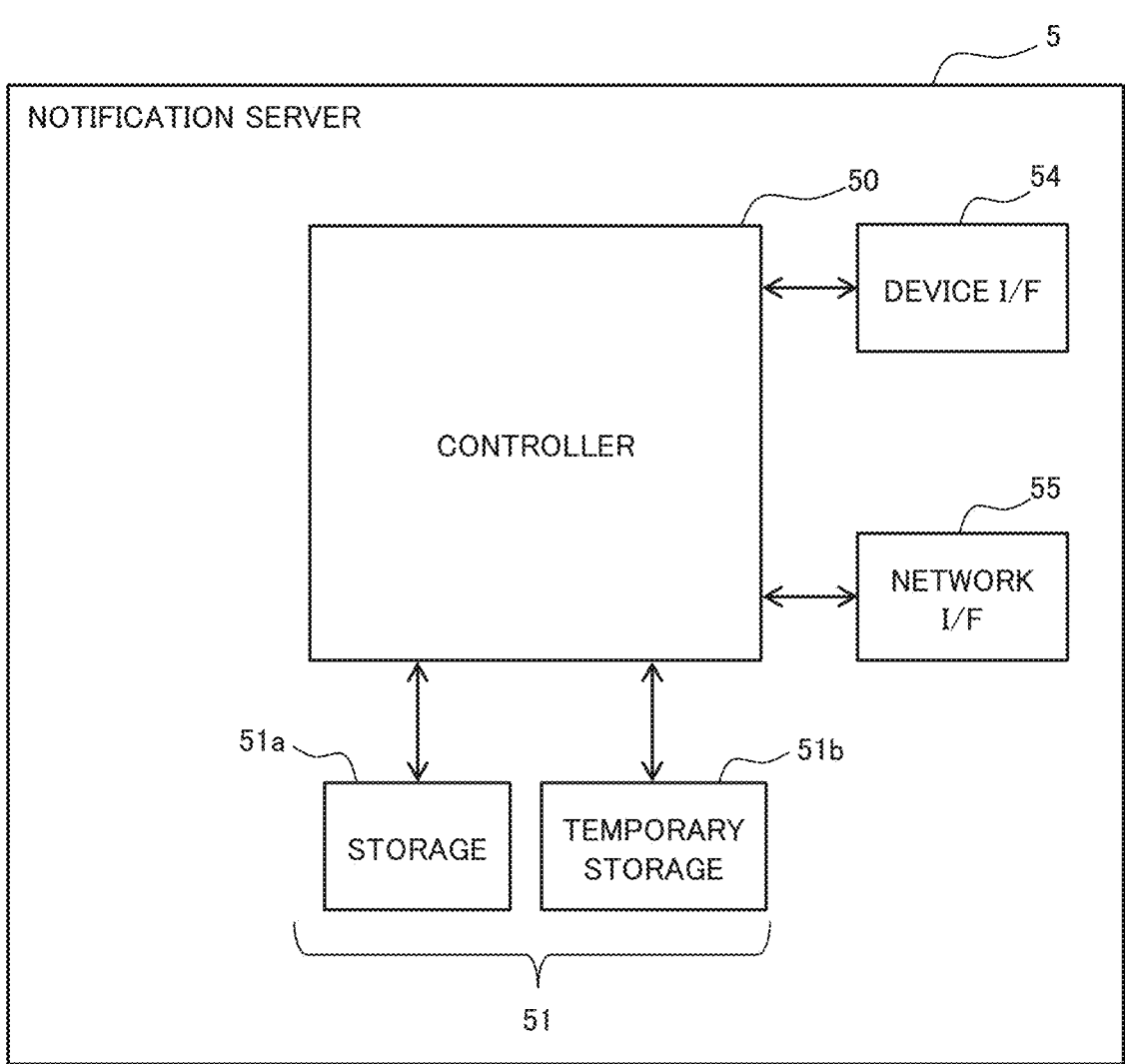
FIG. 3 is a block diagram illustrating the configuration of a notification server according to the first embodiment.

FIG. 3 is a block diagram illustrating the configuration of the notification server 5. The notification server 5 is implemented by an information processing device such as a computer. The notification server 5 illustrated in FIG. 3 includes a controller 50, a memory 51, a device I/F 54, and a network I/F 55.

The controller 50 includes a CPU or MPU that implements a predetermined function in cooperation with software, for example. The controller 50 controls the overall operation of the notification server 5, for example. The controller 50 performs, reading out data and programs stored in the memory 51, a variety of arithmetic processing to implement various functions. The operation by various functions of the notification server 5 will be described later.

The controller 50 executes a program including a command group implementing the function of the notification server 5 described above, for example. The above program may be provided from the communication network 3 or may be stored in a portable recording medium. The controller 50 may include an internal memory as a temporary storage area that holds various data and programs.

The controller 50 may be a hardware circuit such as a dedicated electronic circuit or a reconfigurable electronic circuit designed to implement each of the above functions. The controller 50 may be composed of various semiconductor integrated circuits such as CPU, MPU, GPU, GPGPU, TPU, microcomputer, DSP, FPGA, and ASIC.

The memory 51 is a storage medium that stores a program and data necessary for implementing the function of the notification server 5. As illustrated in FIG. 3, the memory 51 includes a storage 51*a* and a temporary storage 51*b*.

The storage 51*a* stores parameters, data, a control program, and the like for implementing a predetermined function. The storage 51*a* is configured by an HDD or SSD, for example. For example, the storage 51*a* stores the above-described program, map information indicating a placement of the pieces of equipment A1, A2 and the like in the workplace 6 in a predetermined coordinate system, and the like.

The temporary storage 51*b* is configured by a RAM such as DRAM or SRAM and temporarily stores data, for example. For example, the temporary storage 51*b* holds the position information and the like received from the operator terminal 4. The temporary storage 51*b* may function as a work area of the controller 50 or may be configured by a storage area in the internal memory of the controller 50.

The device I/F 54 is a circuit connecting an external device to the notification server 5. The device I/F 54 performs communication conforming to a predetermined communication standard similarly to the device I/F 44 of the operator terminal 4, for example. The device I/F 54 may constitute a communication interface connected to an external device via the communication network 3. The device I/F 54 may constitute, in the notification server 5, an acquisition interface that receives various types of information from an external device or an output interface that transmits various types of information to the external device.

Network I/F 55 is a circuit connecting the notification server 5 to the communication network 3 via a wireless or wired communication line. The network I/F 55 performs communication conforming to a predetermined communication standard similar to the network I/F 45 of the operator terminal 4, for example. The network I/F 55 is an example of a communication interface that performs data communication with the operator terminal 4 in the present embodiment.

In the present embodiment, the network I/F 55 receives, by data communication with the operator terminal 4, the position information generated by the operator terminal 4 using a beacon positioning technology, for example. The network I/F 55 is an example of a position information obtainer in the present embodiment. The position information in the operator terminal 4 is not particularly limited to be generated by the beacon positioning, and may be generated by positioning using a WiFi access point or positioning using a GPS.

The network I/F 55 establishes communication connection with the pieces of equipment A1 and A2 via the communication network 3 and receives the state information from the pieces of equipment A1 and A2 at any time, for example. The network I/F 55 is an example of a state information obtainer in the present embodiment. The network I/F 55 may configure an acquisition interface receiving various information or an output interface transmitting various information in the notification server 5 via the communication network 3.

The configuration of each of the operator terminal 4 and the notification server 5 as described above is an example, and the configuration is not limited to the above example. The alert method according to the present embodiment may be executed in distributed computing. Various acquisition interfaces in the operator terminal 4 and in the notification server 5 may be respectively implemented by cooperation with various software in the controllers 40 and 50 and the like. The acquisition interfaces may acquire various information by reading various information stored in various storage medias (e.g., the storages 41*a* and 51*a*) to work areas (e.g., temporary storages 41*b* and 51*b*) of the controllers 40 and 50.

2. Operation

The operations of the alert system 1, the notification server 5, and the operator terminal 4 configured as described above will be described below.

2-1. Outline of Operations

An outline of the operation of the alert system 1 according to the present embodiment will be described with reference to FIGS. 1 and 4.

In the alert system 1 illustrated in FIG. 1, upon receiving the state information from each of the pieces of equipment A1 and A2 via the communication network 3, the notification server 5 detects, based on the state information, an irregular state in which an irregularity occurs in any of the pieces of equipment A1 and A2, for example. When the irregular state is detected, the notification server 5 transmits the notification information to the operator terminals 4-1 to 4-3 of the operators W1 to W3. Each operator terminal 4 displays the received notification information on the display 43, for example.

Figure 4A:
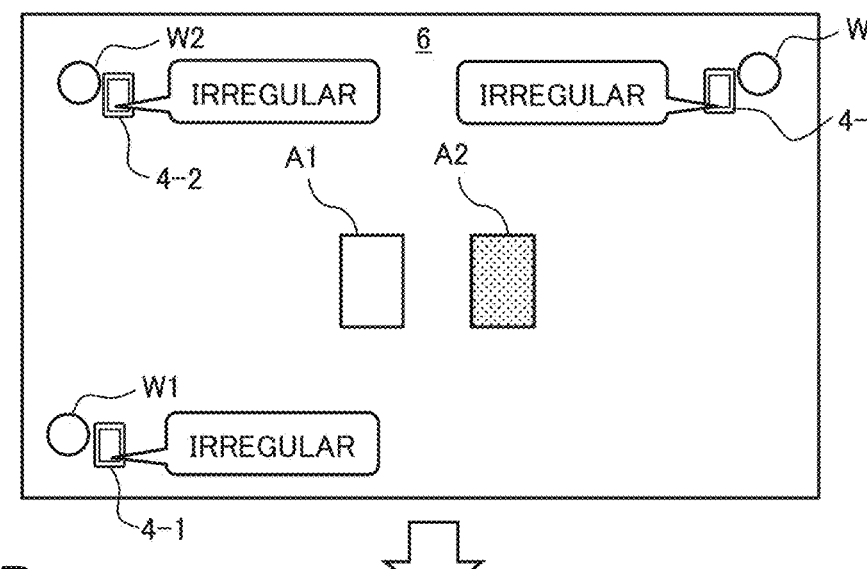
FIGS. 4A to 4C are diagrams for explaining an operation of the alert system.
Figure 4B:
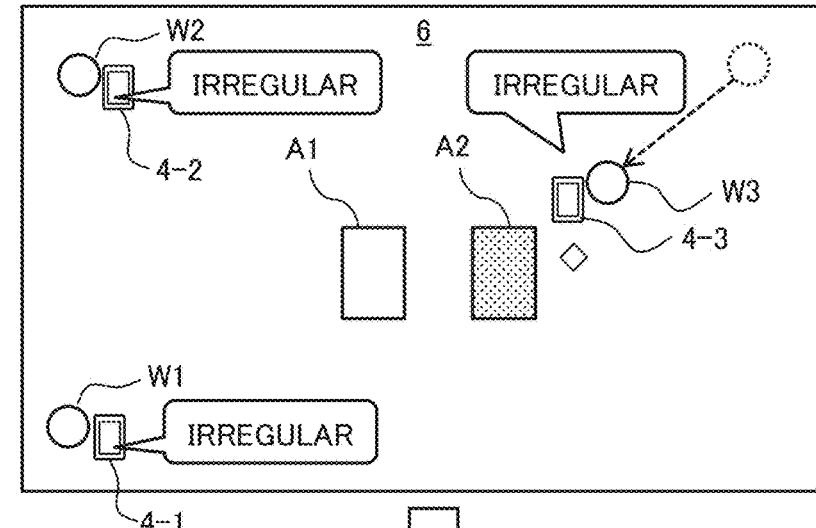
Figure 4C:
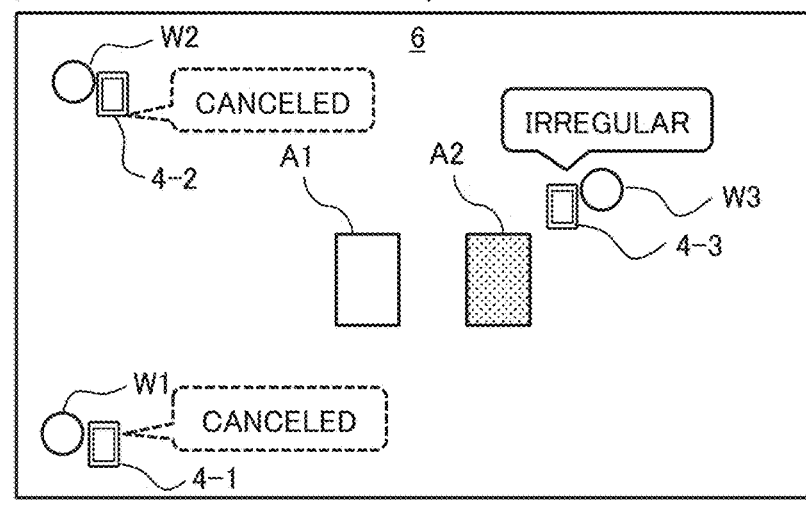

FIGS. 4A to 4C are diagrams for explaining the operation of the alert system 1 according to the present embodiment. FIGS. 4A to 4C illustrate scenes in which the workplace 6 is viewed from above.

FIG. 4A illustrates an example in which the irregular state of the specific equipment A2 is detected. Hereinafter, the equipment A2 in the irregular state is also referred to as an irregular equipment A2. In the example in FIG. 4A, the notification server 5 transmits the notification information to the operator terminals 4-1 to 4-3 of all the operators W1 to W3 in the workplace 6, for calling each operator to the detected irregular equipment A2. Accordingly, it is possible to notify all the operators W1 to W3 of the irregular state of the equipment A2, to accelerate handling of the irregular equipment A2 by any of operators W.

FIG. 4B illustrates an example in which one operator W3 moves toward the irregular equipment A2, from the scene in FIG. 4A, in response to a call based on the notification information received by the operator terminal 4-3. In such a scene, it can be predicted that the moving operator W3 handles the irregular equipment A2 to resolve the irregular state. On the other hand, it is concerned that the other operators W1 and W2 subsequently move to the irregular equipment A2 but the movement ends up in vain. For example, it is concerned that all the operators W1 to W3 gather to the irregular equipment A2, leading to a decrease in work efficiency in the workplace 6.

Therefore, when the operator W3 moves toward the irregular equipment A2, the system 1 transmits the notification information for canceling the call to the irregular equipment A2 to the operator terminals 4-1 and 4-2 respectively corresponding to the other operators W1 and W2, for example.

FIG. 4C illustrates an example in which, after the scene in FIG. 4B, the operator terminals 4-1 and 4-2 receive the notification information canceling the call and change the display. In the example in FIG. 4C, cancellation is notified to the operators W1 and W2, and only the operator W3 responds to the call to the irregular equipment A2. According to such cancellation, it is possible to avoid a waste as described above that the other operators W1 and W2 move to the irregular equipment A2 to which the operator W3 has already moved. As described above, according to the system 1, it is possible to reduce excessive labor of the other operators W1 and W2 and to efficiently handle the irregular equipment A2 in the workplace 6 while promptly securing the operator W3 as a responder handling the irregular equipment A2.

2-2. Overall Operation of System

Figure 5:
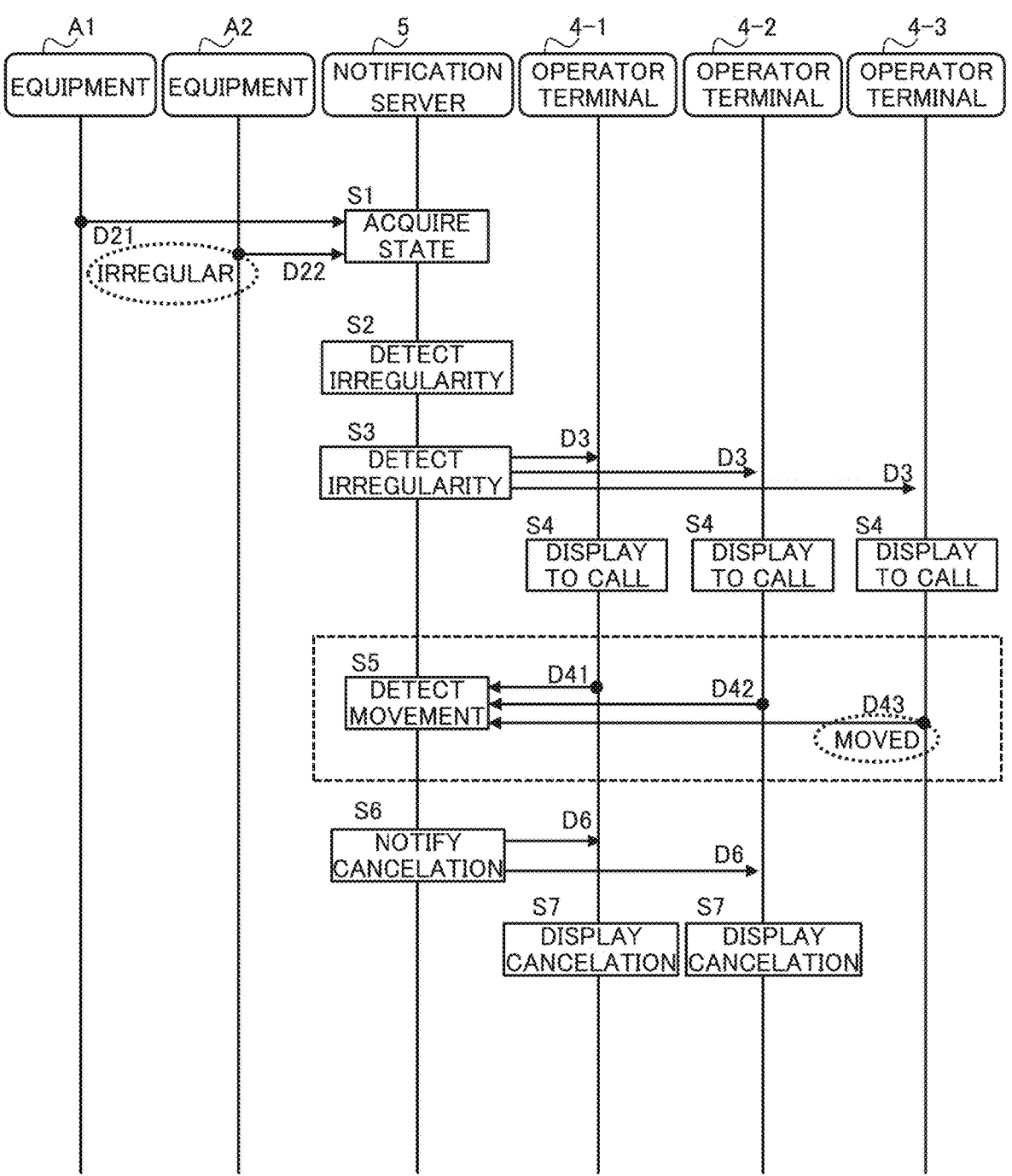
FIG. 5 is a diagram for explaining an operation example of the alert system.
Figures 6A, 6B:
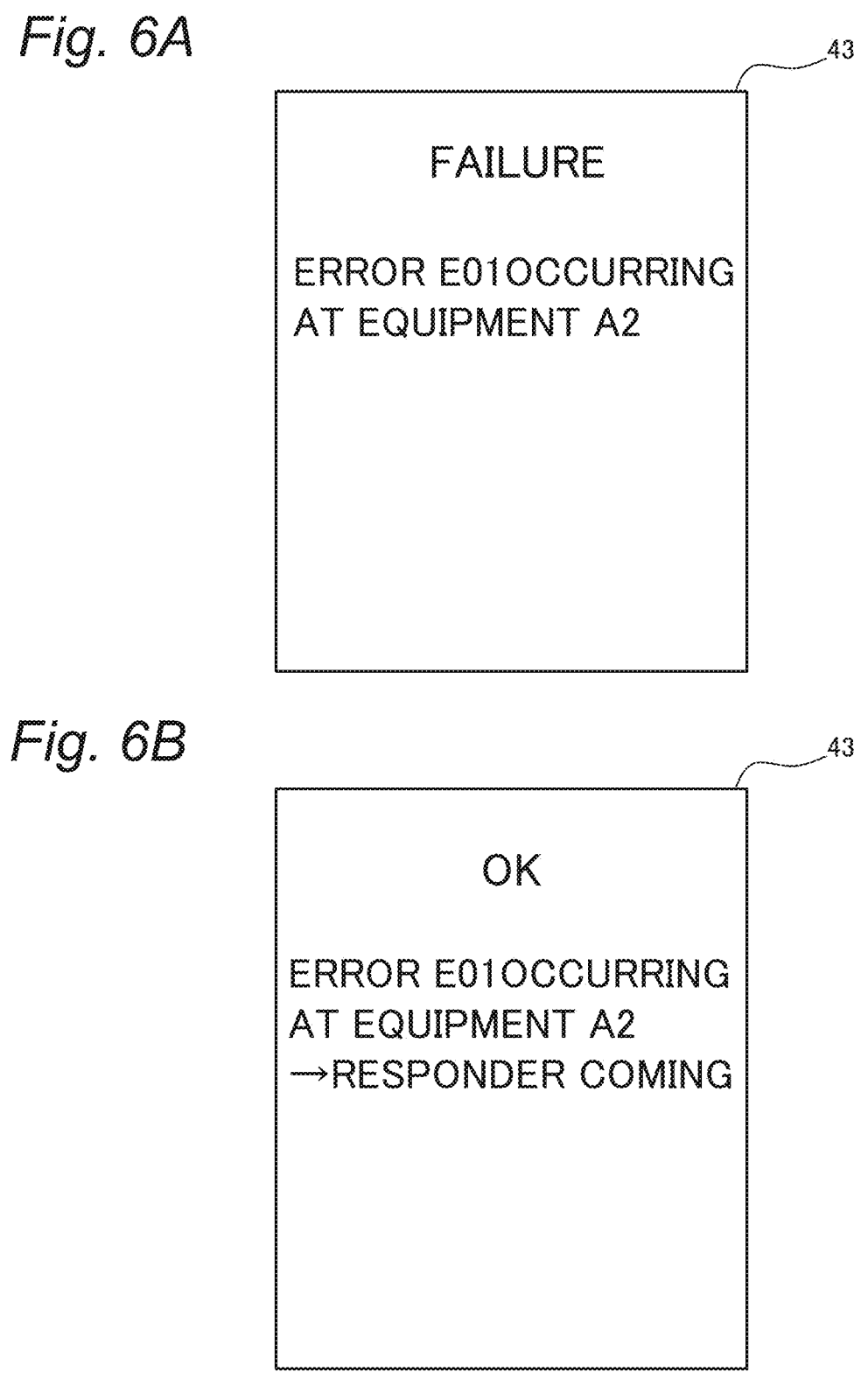

The overall operation of the alert system 1 according to the present embodiment will be described with reference to FIGS. 5, 6A and 6B. FIG. 5 is a diagram for explaining an operation example of the system 1. FIG. 5 illustrates an operation sequence of the system 1 corresponding to the example in FIGS. 4A to 4C. FIGS. 6A and 6B are diagrams illustrating a display example of notification in the operator terminal 4 of the alert system 1.

In the system 1, the notification server 5 acquires state information D21 and D22 indicating the operating states of the pieces of equipment A1 and A2 in the workplace 6 (S1). Each of the pieces of equipment A1 and A2 generates the state information D21 and D22 at predetermined time intervals and transmits the state information to the notification server 5 in association with time, for example. The pieces of state information D21 and D22 include information indicating whether the irregularity such as a failure occurs in the pieces of equipment A1 and A2 respectively and details of the irregularity by an error code or the like, for example.

The notification server 5 according to the present embodiment detects the irregular state of each of the of equipment A1 and A2 based on the acquired pieces of state information D21 and D22, for example (S2). In the example in FIG. 5, it is specified that the equipment A2 is in the irregular state based on the state information D22.

When the irregular state is detected, the notification server 5 transmits an irregularity notification D3 indicating that the equipment A2 is in the irregular state to each operator terminal 4, as the notification information for calling each operator W to the detected irregular equipment A2, for example (S3). In the example in FIG. 5, the irregularity notification D3 is transmitted to the operator terminals 4-1 to 4-3 respectively corresponding to the operators W1 to W3.

Upon receiving the irregularity notification D3 from the notification server 5, each operator terminal 4 displays the irregularity notification D3 on the display 43 (S4). FIG. 6A illustrates a display example of the irregularity notification D3 in the operator terminal 4. The display 43 in FIG. 6A displays "FAILURE" indicating that the irregular state is detected and a message indicating details of the irregularity, for example. In the example in FIG. 6A, the message indicating occurrence of "failure E01" is displayed as the details of the irregularity in the irregular equipment A2.

After transmitting the irregularity notification D3 (S3), the notification server 5 detects the operator W moving to the irregular equipment A2 (S5). Such movement detection processing (S5) is performed to transmit a cancellation notification D6 (S6), which is described later, when the responder, moving to the irregular equipment A2 in response to the display of the irregularity notification D3 (S4), is detected among the plurality of operators W.

In the movement detection processing (S5) according to the present embodiment, the notification server 5 detects the movement of the responder by acquiring the position information D41, D42, and D43 transmitted at a predetermined cycle from the operator terminals 4-1 to 4-3 respectively corresponding to the operators W1 to W3, for example. In the example in FIG. 5, the operator W3 moving as the responder is detected based on the position information D43.

When the movement of the responder is detected, the notification server 5 according to the present embodiment transmits the cancellation notification D6 indicating cancellation of the irregularity notification D3 to the operator terminal 4 except for the responder, as the notification information for canceling the call to the irregular equipment A2, for example (S6). In the example in FIG. 5, the notification server 5 transmits the cancellation notification D6 to the operator terminals 4-1 and 4-2 respectively corresponding to the operators W1 and W2 other than the operator W3.

Upon receiving the cancellation notification D6 from the notification server 5, each operator terminal 4 displays the cancellation notification D6 on the display 43 (S7). FIG. 6B illustrates a display example of the cancellation notification D6 in the operator terminal 4. The display 43 in FIG. 6B displays "OK" indicating that the irregular state is resolved and a message indicating that the responder appears in response to the notification in FIG. 6A. Display control according to the cancellation notification D6 is not limited to the display example in FIG. 6B, and may be display control erasing the display of the irregularity notification D3 illustrated in FIG. 6A on the display 43, for example.

The alert system 1 repeats the above processing (S1 to S7) periodically, for example.

According to the above processing, the irregular state of the equipment A2 detected in the irregularity detection processing (S2) is notified to the operator W by the irregularity notification D3 (S3, S4). Thereafter, when the movement of the responder is detected by the movement detection processing (S5), the cancellation notification D6 notifies, to the operator W other than the responder, cancellation of the irregularity notification D3 (S6, S7). This allows notifying, to each operator W, the irregular equipment A2 to urge the operator W to take a prompt measure against the irregular state, and cancelling the irregularity notification D3 upon the detection of the responder moving to the irregular equipment A2, thereby suppressing a decrease in work efficiency, such that a plurality of operators W excessively gathers to the irregular equipment A2, for example. According to the movement detection processing (S5), even when the operator W3 does not operate the operator terminal 4 as the responder, it is possible to automatically notify the other operators W1 and W2 of the cancellation in response to the detection of the moving operator W3, for example.

2-3. Operation Upon Detection of Irregularity

The operation of the notification server 5 upon detection of the irregular state in the alert system 1 described above will be described with reference to FIGS. 7 to 9.

Figure 7:
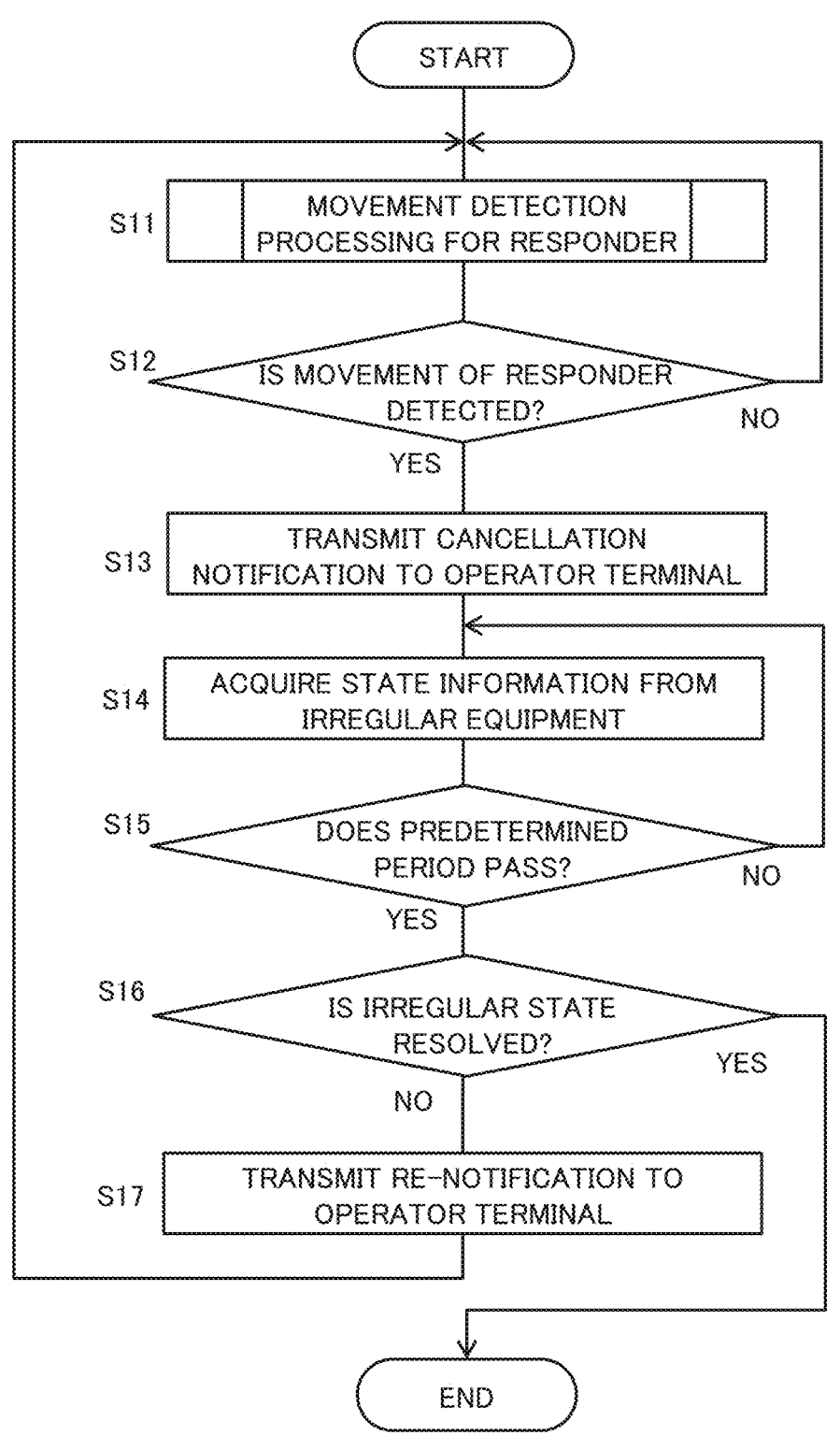
FIG. 7 is a flowchart illustrating an operation upon detection of the irregularity by the alert system according to the first embodiment.
Figure 8:
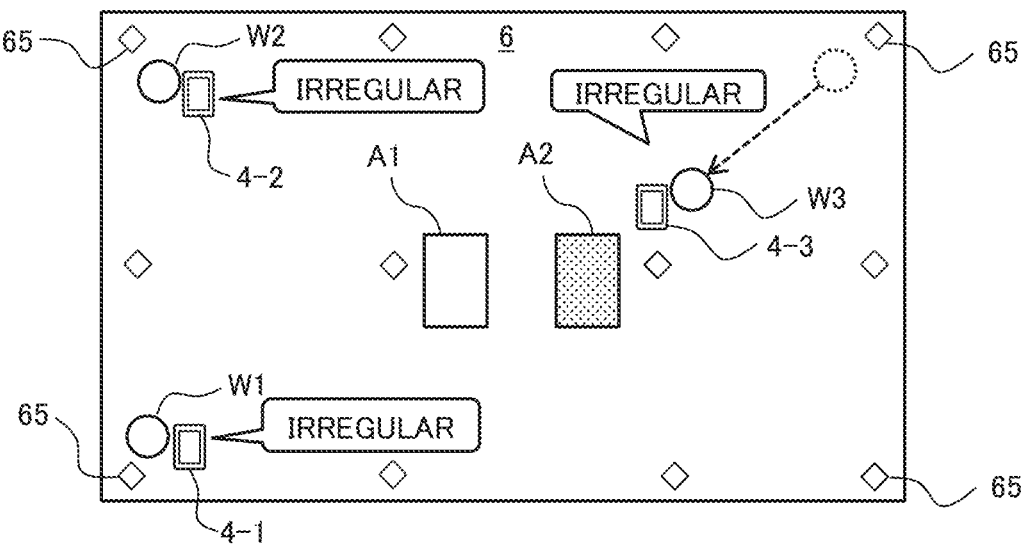
FIG. 8 is a diagram for explaining movement detection processing in the alert system according to the first embodiment.
Figure 9:
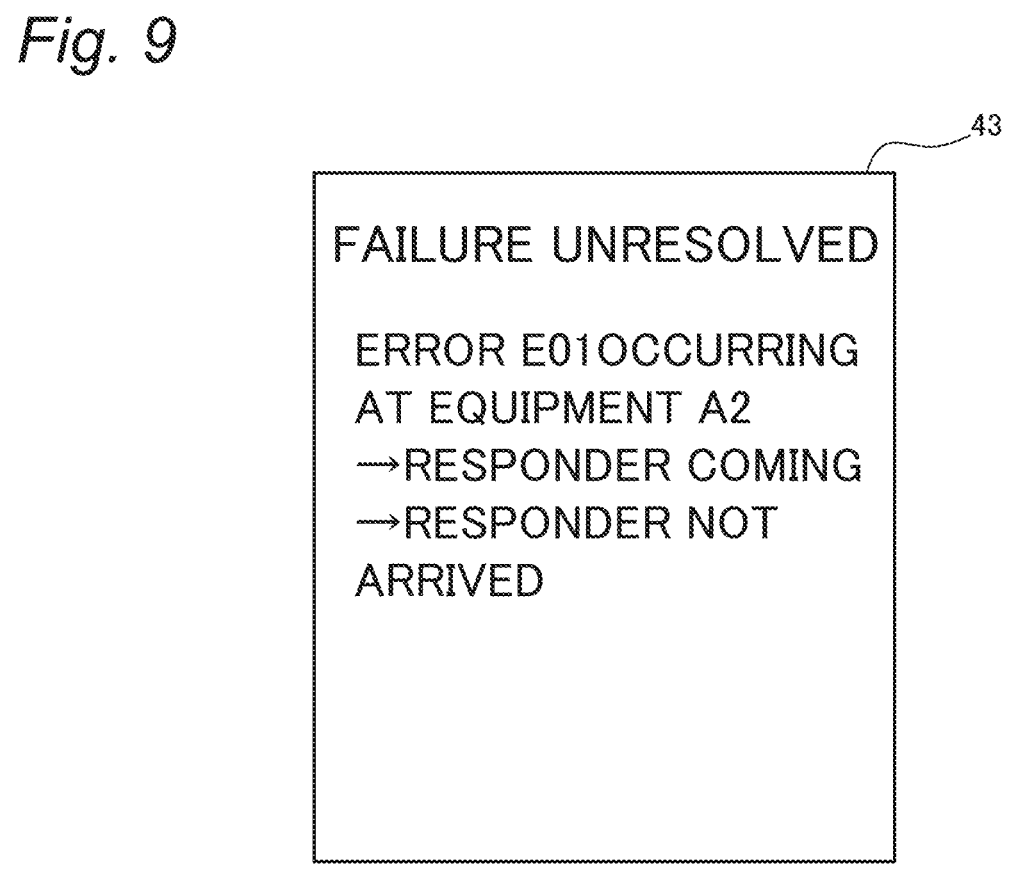

FIG. 7 is a flowchart illustrating an operation when the irregularity is detected by the alert system 1 according to the present embodiment. FIG. 8 is a diagram for explaining movement detection processing in the alert system 1 according to the present embodiment. FIG. 9 is a diagram illustrating a further display example on the operator terminal 4.

The flowchart of FIG. 7 is started after the transmission of the irregularity notification D3 (S3) in a state in which the irregular equipment A2 is specified in step S2 in FIG. 5, for example. Each process in this flowchart is executed by the controller 50 of the notification server 5, for example.

First, the controller 50 detects the operator W moving as the responder to the irregularity notification D3 (S11). The processing detecting the movement of the responder (S11) and the processing in step S12 correspond to step S5 in FIG. 5. The processing in step S11 is also simply referred to as movement detection processing.

In the alert system 1 according to the present embodiment, the notification server 5 performs the movement detection processing based on the position information received from each operator terminal 4 (S11). An example of generating the position information by the operator terminal 4 in the movement detection processing according to the present embodiment will be described with reference to FIG. 8.

In the alert system 1 according to the present embodiment as illustrated in FIG. 8, a plurality of beacon transmitters 65 are installed in various places in the workplace 6 in advance, for example. The beacon transmitters 65 is not shown in the drawings other than FIG. 8. The operator terminal 4 according to the present embodiment communicates with the beacon transmitters 65 at various places in the workplace 6 via the device I/F 44 to generate position information based on information received from the nearby beacon transmitter 65. The details of the movement detection processing (S11) will be described later.

Referring back to FIG. 7, next, the controller 50 determines, based on the detection result in the movement detection processing (S11), whether or not the movement of the responder is detected, that is, whether or not the operator W moving as the responder is detected (S12). When the controller 50 determines that the movement of the responder is not detected (NO in S12), the movement detection processing (S11) is repeated at a predetermined detection cycle such as a transmission cycle of the position information by the operator terminal 4, for example.

On the other hand, when the movement of the responder is detected (YES in S12), the controller 50 transmits the cancellation notification D6 to the operator terminal 4 of the operator W other than the responder (S13), for example. Step S13 corresponds to step S6 in FIG. 5.

After transmitting the cancellation notification D6 (S13), the controller 50 performs processing related to a re-notification (S14 to S17). In the alert system 1, even when the movement of the responder is detected (YES in S12), it is conceivable that the irregular state is not resolved due to the responder not reaching the irregular equipment A2, for example. Therefore, in the alert system 1 according to the present embodiment, when a predetermined period passes without resolving the irregular state, processing for re-notifying each operator W of the irregular state is performed, for example (S14 to S17).

Specifically, first, the controller 50 acquires state information newly received from the irregular equipment A2 via the network I/F 55 (S14), for example. The controller 50 holds the acquired state information in the temporary storage 51b, for example.

Next, the controller 50 determines whether or not a predetermined period passes from the time of transmitting the cancellation notification D6 (S13), for example (S15). The predetermined period is set from the viewpoint of predicting a period required for the detected responder to arrive at the irregular equipment A2 and resolve the irregular state by handling the irregular equipment A2, for example. When the predetermined period does not pass (NO in S15), the controller 50 repeats the acquisition of state information from the irregular equipment A2 (S14).

When the predetermined period passes (YES in S15), the controller 50 determines whether or not the irregular state is resolved based on the state information acquired from the irregular equipment A2, for example (S16). For example, in a case where the state information D22 does not indicate the irregularity in the equipment A2 after any time point in the predetermined period, the controller 50 determines that the irregular state is resolved.

When the irregular state is not resolved (NO in S16), the controller 50 transmits the re-notification calling each operator W again to the irregular equipment A2, as the notification information, to the operator terminals 4-1 and 4-2 being transmission destinations of the cancellation notification D6 (S17). FIG. 9 is a diagram illustrating a display example of the re-notification in the operator terminal 4. The display 43 illustrated in FIG. 9 displays "FAILURE UNRESOLVED" indicating that the irregular state notified by the irregularity notification D3 is not canceled, a message indicating that the responder is not arrived at the irregular equipment A2, and the like, for example.

Accordingly, when the irregular state is not resolved, such as when the operator W3 as the responder does not handle or cannot handle the irregular equipment A2, it is possible to notify the irregular state again to the operator terminals 4-1 and 4-2 of the other operators W1 and W2, and to urge the operators W1, W2 to handle the irregular equipment A2, for example.

After the transmission of the re-notification (S17), the controller 50 repeats the processing in and after the movement detection processing (S11).

In contrast to this, when the irregular state is resolved (YES in S16), the controller 50 ends the processing illustrated in this flowchart without executing the transmission of the re-notification (S17).

According to the above processing, when the movement of the responder to the irregularity notification D3 is detected by the movement detection processing (S11) (YES in S12), the cancellation notification D6 is transmitted to the operator terminals 4 except for the responder (S13). This makes it possible to avoid inefficiency such as other operators W1 and W2 heading to the irregular equipment A2 to which the operator W3 has already headed as the responder.

When the irregular state of the irregular equipment A2 is not resolved (NO in S16) after the predetermined period passes from the transmission of the cancellation notification D6 (YES in S15), the re-notification is transmitted to each operator terminal 4 (S17). Therefore, it is possible to secure the operator W for handling the irregular equipment A2 even after the irregularity notification D3 is canceled by the cancellation notification D6.

In the above description, an example is described in which, when the cancellation notification D6 is transmitted (S13), the cancellation notification D6 is transmitted to a part of the operator terminals 4 each corresponding to the operator W other than the responder. In step S13, the controller 50 may transmit the cancellation notification D6 to all operator terminals 4 of the respective operators W including the responder. The determination as to whether the irregular state is resolved (S16) is not limited to be based on the state information at each time within the predetermined period, and may be performed based on the state information at the last time of the predetermined period.

2-3-1. Movement Detection Processing

The details of the movement detection processing in step S11 in FIG. 7 will be described with reference to FIGS. 5 and 10.

Figure 10:
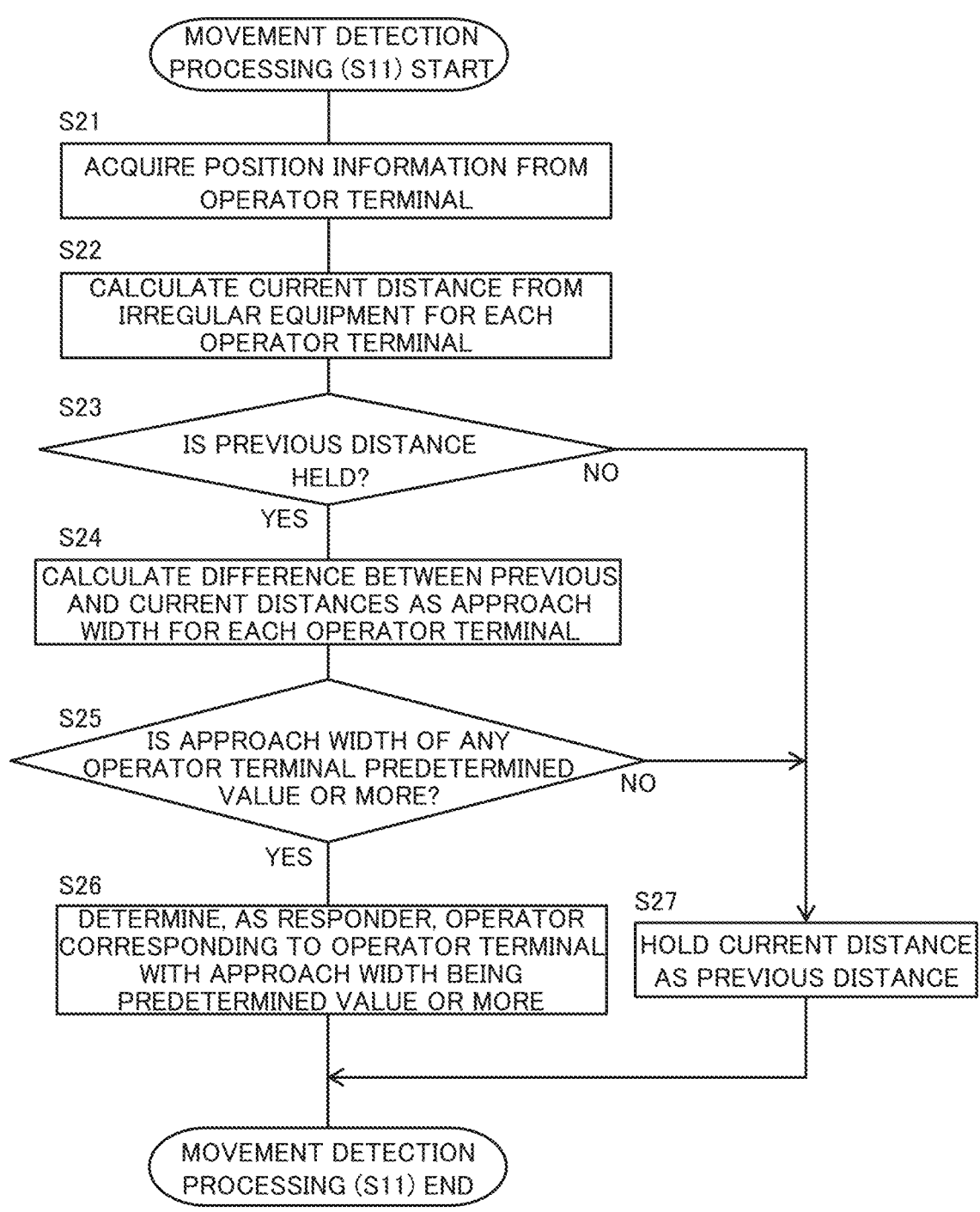
FIG. 10 is a flowchart illustrating movement detection processing in the alert system according to the first embodiment.

FIG. 10 is a flowchart illustrating the movement detection processing in the alert system 1 according to the present embodiment. Similarly to the flowchart in FIG. 7, the processing illustrated in this flowchart is started after the irregularity notification D3 is transmitted (S3) in a state in which the irregular equipment A2 is specified in step S2 in FIG. 5, for example.

First, as illustrated in FIG. 5, the controller 50 acquires the pieces of position information D41 to D43 from the respective operator terminals 4-1 to 4-3 via the network I/F 55, for example (S21). The pieces of position information D41 to D43 are generated based on the position associated with the beacon transmitter 65 closest to each of the operator terminals 4-1 to 4-3 among the plurality of beacon transmitters 65 installed as illustrated in FIG. 4B in the workplace 6, for example.

Next, the controller 50 calculates a current distance of each of the operator terminals 4-1 to 4-3 from the irregular equipment A2 based on the pieces of position information D41 to D43 acquired in step S21 in the current processing (S22). The controller 50 calculates the current distance by calculating the Euclidean distance referring to map information including the position of the equipment A2 in the workplace 6. The map information is stored in advance in the storage 51a, for example.

Next, the controller 50 determines whether the current distance between each operator terminal 4 and the irregular equipment A2 calculated in step S21 in the previous movement detection processing, that is, the previous distance, is held (S23). For example, in the first movement detection processing after the irregular state is detected, the controller 50 proceeds to NO in step S23.

When the previous distance is not held (NO in S23), the controller 50 holds the current distance calculated in step S11 as the previous distance in the temporary storage 51b, for example (S27). Thereafter, the process returns to step S12 in FIG. 7, and since the movement of the responder is not detected (NO in S12), the movement detection processing (S11) at the next detection cycle is performed.

When the previous distance is held (YES in S23), the controller 50 calculates a difference between the previous distance and the current distance, that is, an approach width for each operator terminal 4 (S24). The approach width of each operator terminal 4 indicates, by the difference from the previous distance to the current distance with respect to the irregular equipment A2, a margin of the distance in which the operator W corresponding to each operator terminal 4 approaches the irregular equipment A2 during the detection cycle of the movement detection processing.

Next, the controller 50 determines whether the calculated approach width of any operator terminal 4 is equal to or more than a predetermined value (S25). The predetermined value is set in advance as a value large enough to expect the movement of the operator W toward the irregular equipment A2 during the detection cycle in the workplace 6.

When the approach width of any operator terminal 4 is equal to or more than the predetermined value (YES in S25), the controller 50 determines the operator W corresponding to the operator terminal 4 as the responder (S26). In the example in FIGS. 4 and 5, the approach width calculated for the operator terminal 4-3 is equal to or more than the predetermined value, and the operator W3 corresponding to the operator terminal 4-3 is determined as the responder. Then, the process proceeds to step S12 in FIG. 7. In this case, since the movement of the responder is detected (YES in S12), the cancellation notification D6 is transmitted to the operators W1 and W2 (S13).

When no approach width of the operator terminal 4 is the predetermined value or more (NO in S25), the controller 50 holds the current distance as the previous distance (S27) and proceeds to processing in step S12 in FIG. 7. In this case, since the movement of the responder is not detected (NO in S12), the movement detection processing (S11), that is, the processing in and after step S21 is performed again.

According to the movement detection processing described above, the approach width, as the difference between the previous distance and the current distance to the irregular equipment A2, is calculated for each operator terminal 4 to detect the movement (S24), and the operator W corresponding to the operator terminal 4 with the approach width equal to or more than the predetermined value is determined as the responder (S26). In this manner, the responder can be determined to the operator W moving a distance, that is, the approach width, in the direction to the irregular equipment A2 within the detection cycle of the movement detection processing, the distance being equal to or more than the predetermined value. Therefore, it is possible to detect the operator W presumed to move, as the movement of the responder, in response to the irregularity notification D3 indicating the irregular equipment A2.

The position information D41 to D43 acquired in step S21 is not limited to the above example. For example, the position information may be calculated by each of the operator terminals 4-1 to 4-3 estimating the distance to each of the plurality of beacon transmitters 65 based on the signal intensity received from the beacon transmitter 65. The beacon transmitter 65 is not limited to a device that can communicate with the device I/F 44 of the operator terminal 4 by the Bluetooth standard, and may communicate by a WiFi access point, for example.

3. Summary

As described above, the notification server 5 according to the present embodiment is an example of an alert device that alerts, to the operators W1 to W3 as an example of a plurality of users, irregularities in the pieces of equipment A1 and A2 installed in the workplace 6 as an example of an environment. The notification server 5 includes a network I/55 and a controller 50. The network I/F 55 is an example each of a communication interface, a state information obtainer, and a position information obtainer. The network I/F 55 performs data communication with the operator terminals 4-1 to 4-3 (an example of a plurality of terminal devices) associated with the plurality of operators W1 to W3, respectively. The controller 50 controls the operation of the network I/F 55 to transmit and receive information. The network I/F 55 acquires the pieces of state information D21 and D22 indicating the states of the pieces of equipment A1 and A2 (S1). The network I/F 55 acquires the pieces of position information D41 to D43 indicating the positions of the operators W1 to W3 in the workplace 6 (S5, S11, S21). Upon specifying that the equipment A2 is in an irregular state based on the pieces of state information D21 and D22 (S2), the controller 50 transmits, to the plurality of operator terminals 4-1 to 4-3, the irregularity notification D3 indicating that the equipment A2 is in the irregular state (S3). After transmitting the irregularity notification D3, the controller 50 detects the operator W3 as an example of the moving operator who moves to the equipment A2 in the irregular state, that is, the irregular equipment A2, among the plurality of operators W1 to W3 based on the pieces of position information D41 to D43 (S5). When the moving operator W3 is detected, the controller 50 transmits the cancellation notification D6 indicating the cancellation of the irregularity notification D3 to a part or all of the plurality of terminal devices 4-1 to 4-3 to which the irregularity notification D3 is transmitted (S6).

According to the notification server 5 described above, it is possible to reduce, by the cancellation notification D6, excessive labor such that all the operators W1 to W3 respond to the irregularity notification D3 and go to the irregular equipment A2, while securing, by the irregularity notification D3, the operator W3 handling the irregular equipment A2. This makes it possible to reduce the unnecessary movement of the operators W for handling the irregularity in the equipment A1 and A2 in the workplace 6, and to efficiently handle the irregularity by the operators W.

In the present embodiment, when the moving operator W3 is detected (YES in S12), the controller 50 transmits the cancellation notification D6 to the operator terminals 4-1 and 4-2 associated with the operators W1 and W2 other than the detected operator W3, to which the irregularity notification D3 is transmitted, among the plurality of operator terminals 4-1 to 4-3 (S13). This makes it possible to efficiently handle the irregular equipment A2 in the workplace 6 while avoiding a wasted effort such that the other operators W1 and W2 move toward the irregular equipment A2 to which the operator W3 has already moved.

In the present embodiment, the controller 50 determines whether or not the irregular state is resolved during a predetermined period after transmitting the cancellation notification D6 (S15). Upon determining that the irregular state is not resolved (NO in S16), the controller 50 transmits a re-notification to the operator terminals 4-1 and 4-2 to which the cancellation notification D6 is transmitted, the re-notification indicating cancellation of the cancellation notification D6 (S17). Therefore, even when the irregular state is not resolved after the transmission of the cancellation notification D6, it is possible to cancel the cancellation notification D6 and secure the operator W for handling the irregular equipment A2.

In the present embodiment, the network I/F 55 (an example of the position information obtainer) sequentially acquires the pieces of position information D41 to D43 from the operator terminals 4-1 to 4-3 associated with the operators W1 to W3, respectively (S21). In the operator terminals 4-1 to 4-3, the technique for generating the position information D41 to D43 is not limited to positioning using the beacon transmitter 65 and may be positioning using a global positioning satellite system (GPS or GNSS), for example.

In the present embodiment, the controller 50 detects the moving operator W, based on the pieces of position information D41 to D43 sequentially acquired from the network I/F 55, by calculating a change in a distance between each of the operators W1 to W3 and the irregular equipment A2 (S22 to S27). This makes it possible to perform the movement detection processing for the responder (S11) based on the change in the distance between each of the operators W1 to W3 and the irregular equipment A2, for example. In the present embodiment, the controller 50 detects, as the moving operator W, the operator W3 whose approach width to the irregular equipment A2 is the predetermined value or more, the approach width being the change in the calculated distance at a predetermined time interval (e.g., a predetermined cycle) (S26).

In the present embodiment, the alert system 1 is an example of an alert system including the operator terminals 4-1 to 4-3 (an example of the plurality of terminal devices) respectively associated with the plurality of operators W1 to W3 and the notification server 5 (an example of the alert device). In the alert system 1 described above, the notification server 5 allows efficiently handling the irregularity in the equipment A1 and A2 in the workplace 6.

The alert method according to the present embodiment is a method for alerting, to the operators W1 to W3 as an example of a plurality of users, irregularities in the pieces of equipment A1 and A2 installed in the workplace 6 as an example of an environment. In the present method, as an example of a communication interface of a computer that performs data communication with operator terminals 4-1 to 4-3 (an example of a plurality of terminal devices) respectively associated with a plurality of operators W1 to W3, the network I/F 55 of the notification server 5 acquires the pieces of state information D21 and D22 indicating the states of the pieces of equipment A1 and A2 (S1). The network I/F 55 acquires the pieces of position information D41 to D43 indicating the positions of the operators W1 to W3 in the workplace 6 (S5, S11, S21). Upon specifying that the equipment A2 is in an irregular state based on the pieces of state information D21 and D22 (S2), the controller 50 of the notification server 5 transmits, to the plurality of operator terminals 4-1 to 4-3, the irregularity notification D3 indicating that the equipment A2 is in an irregular state (S3). After transmitting the irregularity notification D3, the controller 50 detects the operator W3 as an example of a moving operator to the irregular equipment A2, among the plurality of operators W1 to W3, based on the pieces of position information D41 to D43 (S5). When the moving operator W3 is detected, the controller 50 transmits the cancellation notification D6 indicating the cancellation of the irregularity notification D3 to a part or all of the plurality of terminal devices 4-1 to 4-3 to which the irregularity notification D3 is transmitted (S6).

The present embodiment provides a program for causing a computer to execute the above alert method. According to the above alert method and program, it is possible to efficiently handle the irregularity in the equipment A1 and A2 in the workplace 6.

Second Embodiment

Hereinafter, the second embodiment of the present disclosure will be described with reference to FIGS. 11 and 12. The first embodiment is exemplified the alert system 1 that cancels the irregularity notification D3 upon detecting the movement of the operator W to the irregular equipment A2 after the transmission of the irregularity notification D3. The second embodiment will exemplify an alert system 1 that controls the cancellation of an irregularity notification D3 based on information on the operator W moving to the irregular equipment A2.

Hereinafter, a description of the same configuration and operation as those of the alert system 1 according to the first embodiment will be appropriately omitted, and the alert system 1 according to the present embodiment will be described.

In the alert system 1 according to the present embodiment, the notification server 5 uses, as the information on the operator W, qualification information indicating whether or not each operator W is a qualified operator having a qualification to handle the irregular state of each of pieces of equipment A1 and A2. For example, in the movement detection processing, when the operator W whose movement to the irregular equipment A2 is detected does not correspond to the qualified operator in the qualification information, the notification server 5 according to the present embodiment does not determine the operator W as the responder. This makes it possible to avoid canceling the irregularity notification D3 when the operator W expected to have difficulty in handling the irregular equipment A2 moves toward the irregular equipment A2.

FIG. 11 is a diagram illustrating a data structure of qualification information D5 in the alert system 1 according to the present embodiment. The qualification information D5 is stored in advance in a storage 51a of the notification server 5, for example. The qualification information D5 manages the qualified operator for the irregular states of the pieces of equipment A1 and A2. The qualified operator in the qualification information D5 is an example of an administrator who manages the pieces of equipment A1 and A2 among the operators W in the workplace 6, and is set as an operator having the qualification for handling the irregular states of the pieces of equipment A1 and A2. The qualification information D5 is an example of administrator information indicating an administrator in the present embodiment. In the example in FIG. 11, the qualification information D5 manages whether or not each of the operators W1, W2, and W3 is the qualified operator for each of the pieces of equipment A1 and A2, according to whether or not each of the operators W1, W2, and W3 has the qualification for each of the pieces of equipment A1 and A2.

Figure 12:
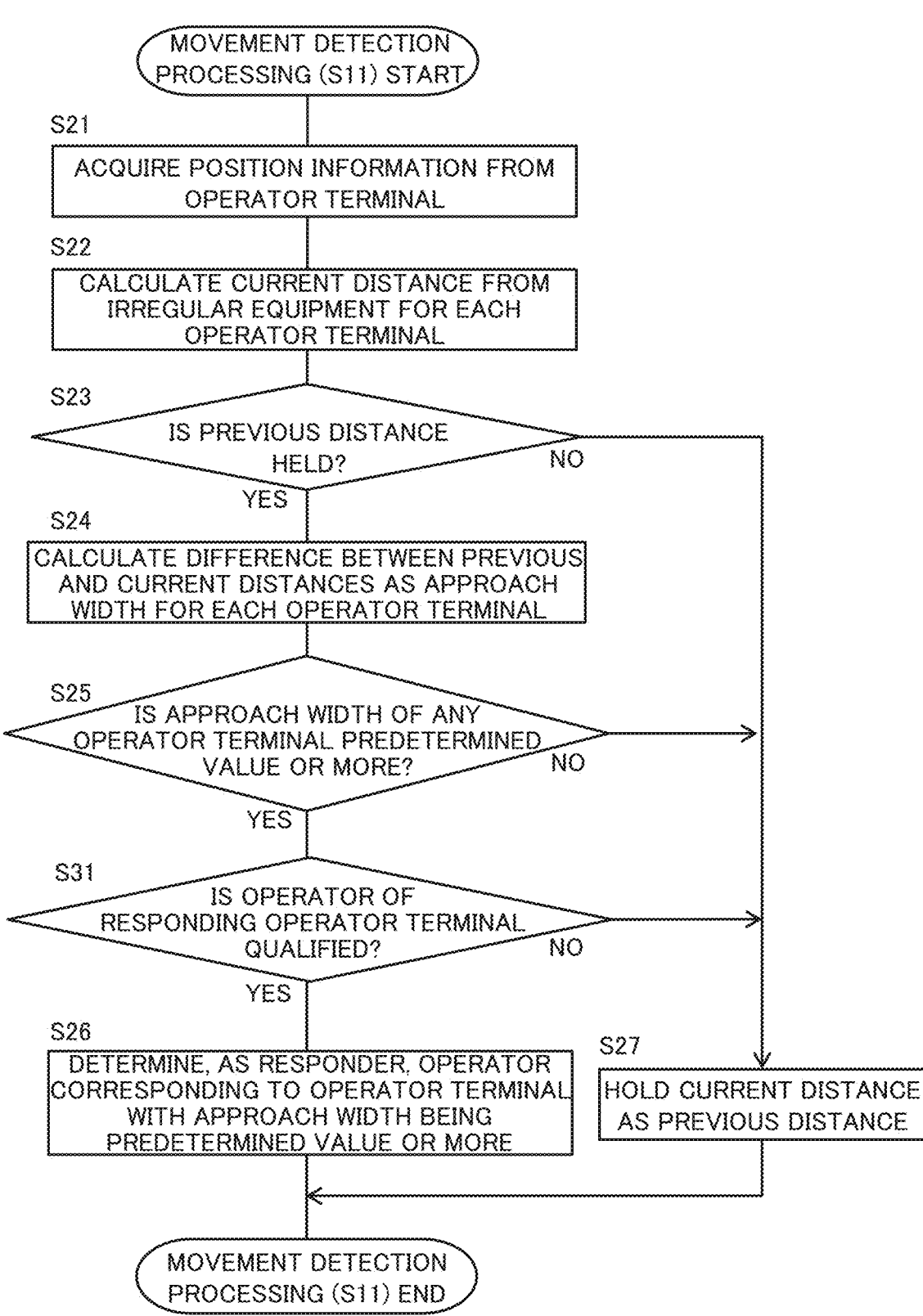
FIG. 12 is a flowchart illustrating movement detection processing in the alert system according to the second embodiment.

FIG. 12 is a flowchart illustrating the movement detection processing in the alert system 1 according to the present embodiment. In the notification server 5 according to the present embodiment, the controller 50 performs a determination processing (S31) based on the qualification information D5, in addition to processing similar to steps S21 to S27 in the movement detection processing according to the first embodiment (FIG. 10), for example For example, when the approach width to the irregular equipment A2 of any operator terminal 4 is equal to or more than the predetermined value (YES in S25), the controller 50 determines whether the operator W of the operator terminal 4 corresponds to the qualified operator for the irregular equipment A2 (S31). The determination in step S31 is performed by comparing the qualified operator indicated by the qualification information D5, stored in advance in the storage 51a, with the operator W whose approach width is determined to be the predetermined value or more in step S25, that is, the operator W whose movement to the irregular equipment A2 is detected, for example.

When the operator W of the operator terminal 4 with the approach width equal to or more than the predetermined value is the qualified operator (YES in S31), the controller 50 determines the operator W of the operator terminal 4 as the responder (S26). For example, in a case in which the approach width of the operator terminal 4-3 to the irregular equipment A2 is equal to or more than the predetermined value, the operator W3 corresponding to the operator terminal 4-3 is determined as the responder since the operator W3 is the qualified operator for the equipment A2 according to the qualification information D5 illustrated in FIG. 11. Thereafter, the controller 50 proceeds to step S12 in FIG. 7.

In contrast to this, when the operator W of the operator terminal 4 with the approach width equal to or more than the predetermined value is not the qualified operator (NO in S31), the controller 50 does not determine the operator W as the responder. For example, when the approach width of the operator terminal 4-2 is equal to or more than the predetermined value, the operator W2 corresponding to the operator terminal 4-2 does not have the qualification for the equipment A2 according to the qualification information D5 in FIG. 11 and hence the operator W2 is not determined as the responder. In this case (NO in S31), the controller 50 holds the current distance as the previous distance (S27), similarly to the case in which there is no operator terminal 4 with the approach width equal to or more than the predetermined value (NO in S25), and proceeds to step S12 in FIG. 7.

According to the above processing, among the operators W whose movement to the irregular equipment A2 is detected (YES in S25), the operator W being the qualified operator for the irregular equipment A2 (YES in S31) is determined as the responder (S26). In this manner, the operator W can be selectively determined as the responder based on the qualification information D5 related to the irregular equipment A2. Therefore, the cancellation notification D6 can be transmitted only when the operator W who can handle the irregular equipment A2 is expected to respond to the irregularity notification D3 (S13 in FIG. 7).

In step S24 described above, an example of calculating the approach widths of all the operator terminals 4 to the irregular equipment A2 is described. In the movement detection processing according to the present embodiment, the approach width for detecting movement may be calculated only for the operator terminal 4 of the qualified operator. For example, in step S21, the controller 50 may acquire the position information only from the operator terminal 4 of the operator W being the qualified operator and may perform the processing in and after step S31 without particularly executing the processing in step S22. Also in this case, the operator W being the qualified operator for the irregular equipment A2 and moving to the irregular equipment A2 can be determined as the responder.

In the alert system 1 according to the present embodiment, the cancellation notification D6 may include information indicating that the movement of the qualified operator is detected as the responder. For example, on the display screen (see FIG. 6B) on the operator terminal 4 based on the cancellation notification D6, the display 43 may display that the responder being the qualified operator appears.

As described above, the notification server 5 according to the present embodiment further includes the storage 51a (an example of a memory), and the storage 51a stores the qualification information D5 (an example of administrator information) indicating the qualified operator (an example of an administrator) who manages the pieces of equipment A1 and A2 among the operators W1 to W3 (an example of a plurality of users). When the operator W3 (an example of a moving user) as the responder is the qualified operator for the irregular equipment A2 (an example of equipment in the irregular state) according to the qualification information D5 (YES in S31), the controller 50 transmits the cancellation notification D6 (S13). When the operator W3 as the responder is not the qualified operator for the irregular equipment A2 according to the qualification information D5 (NO in S31), the controller 50 does not transmit the cancellation notification D6.

According to the notification server 5 described above, when the responder moving to the irregular equipment A2 is not the qualified operator, the call to the irregular equipment A2 by the irregularity notification D3 is continued. This makes it possible to efficiently handle irregularities in the pieces of equipment A1 and A2 among the plurality of operators W, securing the operator W being the qualified operator as the responder.

Third Embodiment

Hereinafter, the third embodiment of the present disclosure will be described with reference to FIGS. 13 and 14. The second embodiment describes the alert system 1 in which the responder is determined using the qualification information in the movement detection processing by the notification server 5. The third embodiment will exemplify an alert system 1 capable of switching whether to display the notification on the operator terminal 4.

Hereinafter, a description of the same configuration and operation as those of the alert systems 1 according to the first and second embodiments will be appropriately omitted, and an alert system 1 according to the present embodiment will be described.

Figure 13:
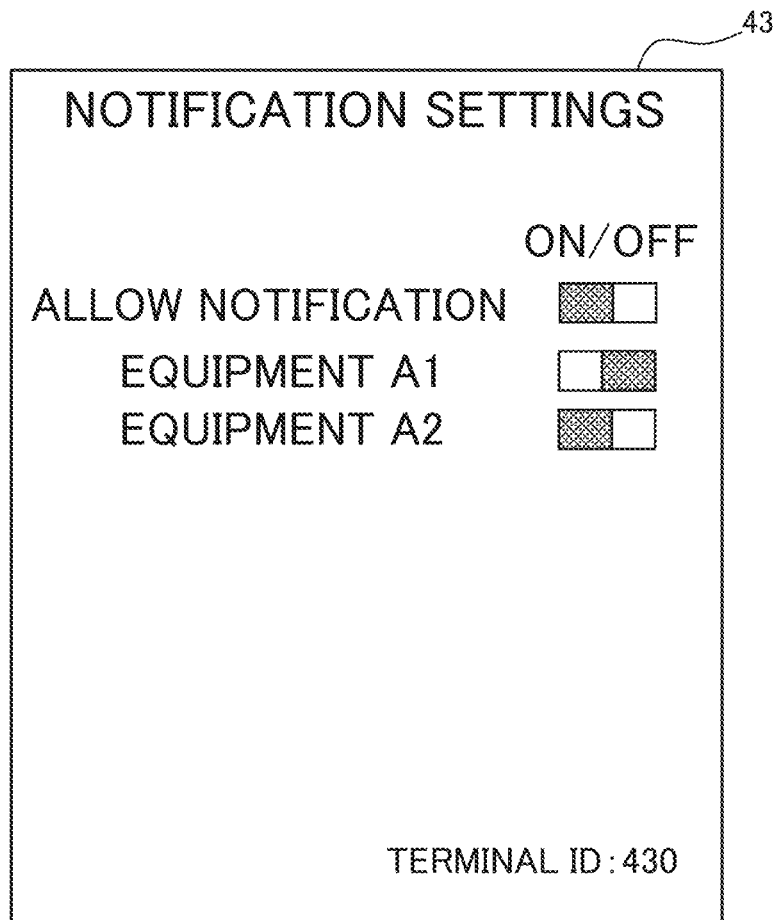
FIG. 13 is a diagram illustrating a display example of a setting screen on the operator terminal according to a third embodiment.

FIG. 13 is a diagram illustrating a display example of a setting screen on the operator terminal 4 according to the present embodiment. In the alert system 1 according to the present embodiment, each operator W can set whether to display or hide the notification which is based on the notification information, including the irregularity notification D3, the cancellation notification D6, and the re-notification, received from the notification server 5 by the operator terminal 4 of the operator W.

In the display example in FIG. 13, the display 43 of the operator terminal 4 displays the setting item "allow notification" set for all the pieces of equipment A1 and A2, the setting items "equipment A1" and "equipment A2" respectively set for the pieces of equipment A1 and A2, and a terminal ID unique to each operator terminal 4. In the example in FIG. 13, the terminal ID "430" corresponding to the operator terminal 4-3 is displayed. The display 43 further displays "ON" and "OFF" for each setting item, that is, selection buttons for switching between valid and invalid. The operation I/F 42 of the operator terminal 4 inputs an operation to select "ON" or "OFF" by the operator W.

For example, when "ON" or "OFF" of "allow notification" is selected, validity or invalidity is collectively set for the setting items of the pieces of equipment A1 and A2. The setting item of each of the pieces of equipment A1 and A2 is set to be valid or invalid by setting the notification allowance or by selecting "ON" or "OFF" of each of the "equipment A1" and the "equipment A2". For example, by setting the equipment A2 for which the operator W3 can handle irregularity to "ON" and setting the other equipment A1 to "OFF", it is possible to switch between validity and invalidity to display the notification related to each of the pieces of equipment A1 and A2. Each operator terminal 4 stores setting information indicating display or non-display of the notification set on such a setting screen in a storage 41*a*, for example.

In the alert system 1 according to the present embodiment, each operator terminal 4 transmits setting information to the notification server 5 at a predetermined cycle or at the time of update by a user operation, for example. The notification server 5 updates (or generates) the qualification information D5 based on the setting information received from each operator terminal 4. The notification server 5 updates the qualification information D5 to set the operator W corresponding to the operator terminal 4 as the qualified operator for the equipment for which the notification setting is "ON" in the setting information. In the example in FIG. 13, the qualification information D5 can be updated reflecting that the operator W3 corresponding to the operator terminal 4-3 having the terminal ID "430" is the qualified operator for the equipment A2 for which the notification setting is "ON".

The operator terminal 4 according to the present embodiment performs display control processing to control, based on the setting information, display when the notification information is received from the notification server 5.

Figure 14:
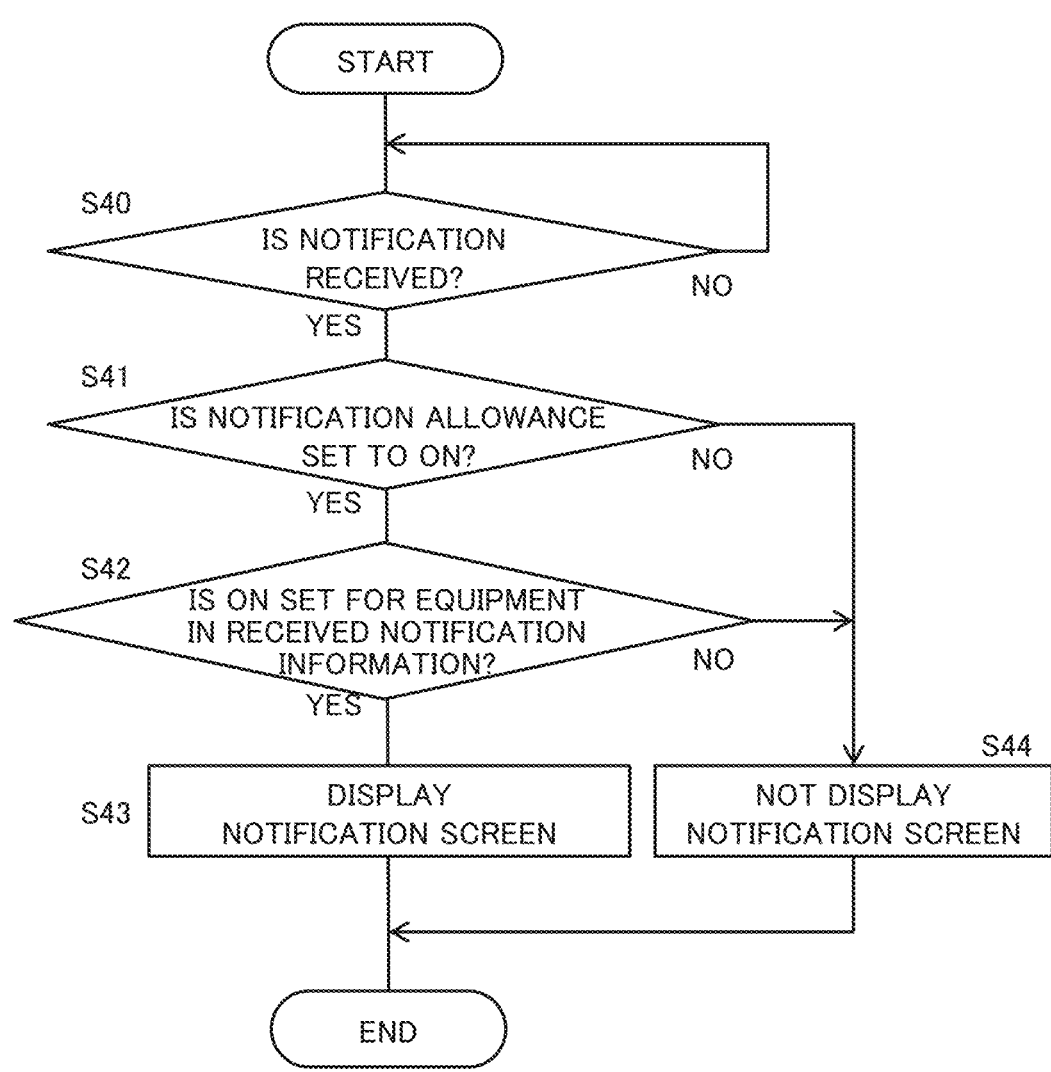
FIG. 14 is a flowchart illustrating display control processing in the operator terminal according to the third embodiment.

FIG. 14 is a flowchart illustrating display control processing in the operator terminal 4 according to the present embodiment. This flowchart starts in a state in which the operator terminal 4 stores the setting information, for example. Each process illustrated in this flowchart is executed by the controller 40 of the operator terminal 4, for example.

First, the controller 40 determines whether notification information such as the irregularity notification D3 is received from the notification server 5 via the network I/F 45, for example (S40). When the notification information is not received (NO in S40), the controller 40 repeats the determination in step S40.

When the notification information is received (YES in S40), the controller 40 refers to the setting information to determine whether the setting of the notification allowance is "ON" (S41). Hereinafter, an example in which notification information regarding the equipment A2 among the plurality of pieces of equipment A1 and A2 in the workplace 6 is received will be described.

When the setting of the notification allowance is "ON" (YES in S41), the controller 40 refers to the setting information regarding the equipment A2 for which the notification information is received to determine whether the setting for the equipment A2 is "ON" (S42).

When the setting of the equipment A2 in the received notification information is "ON" (YES in S42), the controller 40 causes the display 43 to display a notification screen based on the notification information (S43). In the example in FIG. 13, in the operator terminal 4-3 with the terminal ID "430", the setting of the notification allowance is "ON" (YES in S41) and the setting of the equipment A2 is "ON" (YES in S42). In this case, the notification screen regarding the equipment A2 is displayed on the display 43 of the operator terminal 4-3.

In contrast to this, when the setting of the notification allowance is not "ON" (NO in S41) or when the setting of the equipment A1 or the equipment A2 in the received notification information is not "ON" (NO in S42), the controller 40 does not display the notification information on the display 43 (S44).

After the notification screen is displayed (S43) or after the notification screen is not displayed (S44), the controller 40 ends the processing indicated in this flowchart.

According to the above processing, the operator terminal 4 controls, based on the setting information, whether or not to display the notification screen according to the received notification information (S40 to S44). Therefore, the operator terminal 4 of each operator W can selectively display, based on the setting information, a notification related to the corresponding operator W among notifications regarding the pieces of equipment A1 and A2, for example.

As described above, in the alert system 1 according to the present embodiment, each operator terminal 4 (an example of a terminal device) includes the network I/F 45 as an example of a terminal communication interface, the display 43, the operation I/F 42, and the controller 40 as an example of a terminal controller. The network I/F 45 performs data communication with the notification server 5 (an example of the alert device). The display 43 displays information. The operation I/F 42 receives a user operation to set setting information including information indicating enablement or disablement of displaying a notification related to each of the pieces of equipment A1 and A2. The controller 40 selects, based on the setting information, whether or not to display the irregularity notification D3 and the cancellation notification D6 on the display 43 (S40 to S44).

According to the operator terminal 4 described above, each operator W, as an example of a user, can set the operator terminal 4 to display the notification information such as the irregularity notification D3 and the cancellation notification D6 for the equipment related to the operator W among the pieces of equipment A1 and A2, for example. This makes it possible to reduce labor for each operator W among the plurality of operators W to confirm irrelevant notification information, and to efficiently handle irregularities in the pieces of equipment A1 and A2, for example.

In the notification server 5 according to the present embodiment, the qualification information D5, which is an example of the administrator information, manages, as the qualified operator (an example of the administrator), the operator W (an example of the user) associated with the operator terminal 4 from which the setting information (an example of predetermined information), in which the notification is set to "ON", that is, valid for the specific pieces of equipment A1 and A2, is transmitted to a network I/F 55 (an example of the communication unit), based on the setting information. The setting information is an example of the information received by the network I/F 55 from the plurality of operator terminals 4. In the present embodiment, the controller 50 updates the qualification information D5 to manage, as the qualified operator, the operator W associated with the operator terminal 4 from which the predetermined information is transmitted. This makes it possible to efficiently manage the qualified operator in the qualification information D5 using the setting information set by each operator W according to whether or not the operator W can handle the irregular state in each of the plurality of equipment A1 and A2.

Fourth Embodiment

Hereinafter, the fourth embodiment of the present disclosure will be described with reference to FIGS. 15 and 16. The first to third embodiments each have exemplified the alert system 1 that acquires the position information transmitted from the operator terminal 4 and detects the movement of the operator W. The fourth embodiment exemplifies an alert system 1A that detects the movement of an operator W by image recognition in the workplace 6.

Hereinafter, a description of the same configuration and operation as those of the alert systems 1 according to the first to third embodiments will be appropriately omitted, and an alert system 1A according to the present embodiment will be described.

Figure 15:
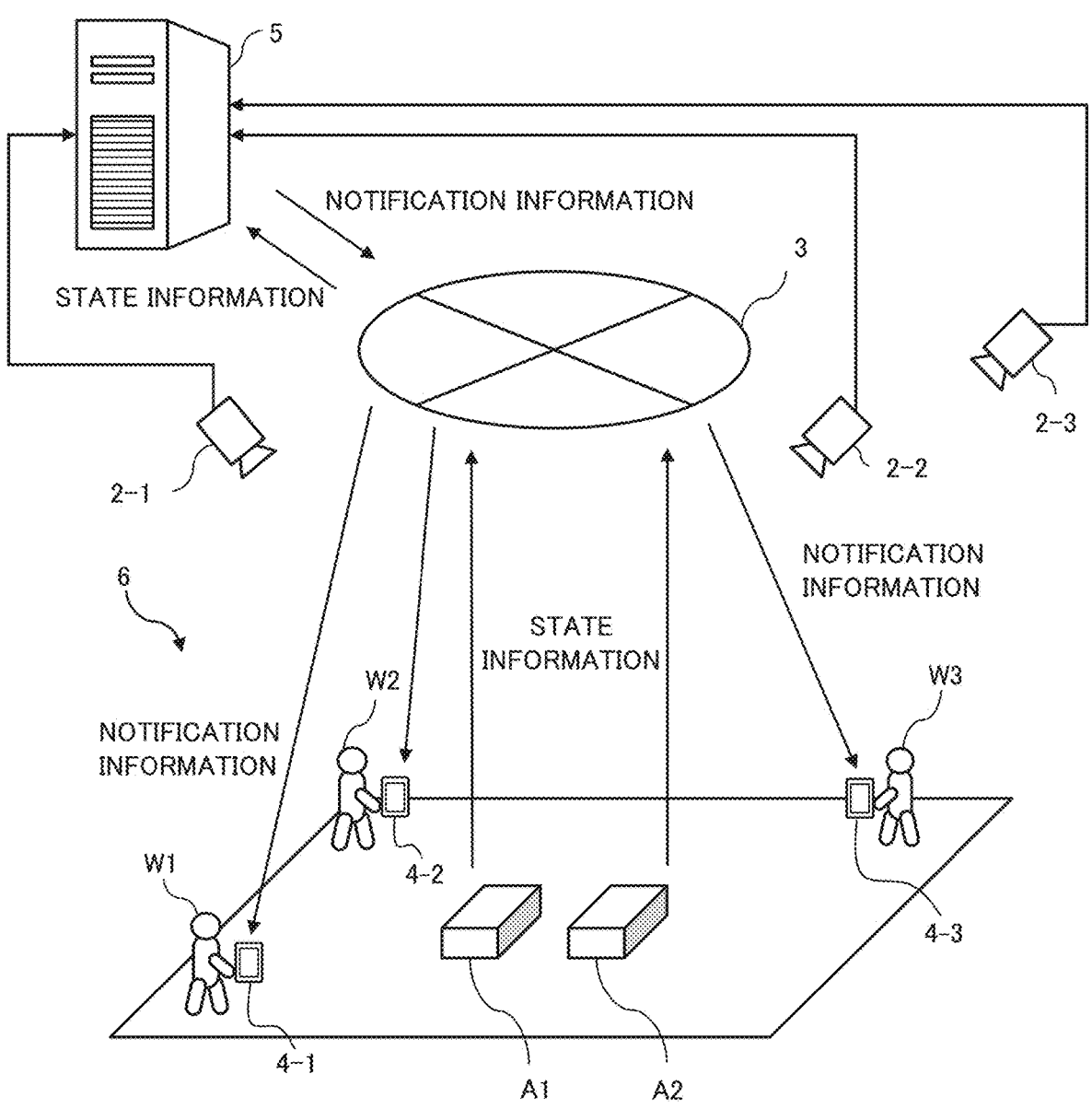
FIG. 15 is a diagram for explaining the alert system according to a fourth embodiment.

FIG. 15 is a diagram for explaining the alert system 1A according to the present embodiment. The system 1A includes a plurality of cameras 2-1, 2-2, and 2-3 in addition to the same configuration as the alert system 1 according to the first embodiment. Hereinafter, the cameras 2-1 to 2-3 are also collectively referred to as a camera 2. Although three cameras 2-1 to 2-3 are illustrated in FIG. 15, the number of cameras 2 included in the system 1A is not particularly limited to three and may be two or less or four or more.

The camera 2 is an example of an imaging device in the system 1A. The camera 2 includes an imager that captures an image and a communication interface that transmits image data indicating the captured image captured by the imager. The imager is implemented by a CCD image sensor, a CMOS image sensor, or the like. The communication interface includes an interface circuit for communicating with an external device in conformity with a predetermined communication standard such as IEEE 802.11.

In the system 1A, the cameras 2-1 and 2-2 are arranged such that images of the pieces of equipment A1 and A2 are captured, respectively. The camera 2-3 is arranged at distances from the pieces of equipment A1 and A2 in the workplace 6 to capture a range in which the operator W moves. The camera 2 repeats an imaging operation at a predetermined cycle in the workplace 6 to generate image data indicating a captured image, for example. The camera 2 is connected to the notification server 5 so that the image data is transmitted to the notification server 5, for example.

In the alert system 1A according to the present embodiment, the notification server 5 recognizes the position of the operator W using the image recognition technology in the image captured by the camera 2-3, thereby performing movement detection processing for the responder, for example. After transmitting the cancellation notification D6, the notification server 5 performs image recognition processing for detecting a predetermined gesture of the responder in the captured image by the camera 2-2 capturing an image of the irregular equipment A2, for example. The predetermined gesture is a gesture in which a person such as the operator W as the responder crosses the arms in order to request transmission of the re-notification.

FIG. 16 is a flowchart illustrating an operation upon the detection of the irregularity in the alert system 1A according to the present embodiment. In the notification server 5, a controller 50 performs movement detection processing by image recognition (S11A) instead of the movement detection processing using the position information from the operator terminal 4 (S11 in FIG. 7) in the first to third embodiments, for example. In the present embodiment, the controller 50 also executes processing related to the re-notification according to the predetermined gesture by the operator W (S51, S52), in addition to processing in step S11A and processing similar to steps S12 to S17 in FIG. 7.

First, the controller 50 acquires image data from the camera 2-1 via the network I/F 55 and performs the movement detection processing for the responder by image recognition (S11A). The controller 50 recognizes the positions of operators W1 to W3 by image recognition based on the acquired image data and generates position information indicating the positions of the operators W1 to W3 in the workplace 6. The controller 50 is an example of a position information obtainer in the present embodiment. Such image recognition processing for recognizing positions is implemented by using a trained model or the like by various types of machine learning or by various image recognition algorithms, for example. Based on the generated position information D41 to D43, the controller 50 performs the same processing as steps S22 to S27 in FIG. 10, for example.

When the movement of the responder is detected (YES in S12), the controller 50 transmits the cancellation notification D6 (S13) and acquires state information from the irregular equipment A2, for example (S14). The controller 50 according to the present embodiment acquires image data from the camera 2-2 capturing an image of the irregular equipment A2 via the network I/F 55 and performs image recognition processing for detecting the predetermined gesture of the responder based on the image data, for example (S51).

The image recognition processing in step S51 is implemented using a trained model or the like by various types of machine learning with an image in which a person performing the predetermined gesture appears as training data, for example. For example, in step S51, the controller 50 inputs an image of a region near the irregular equipment A2 in the acquired image data to the trained model and acquires the recognition result of the gesture from the trained model. The controller 50 determines whether or not the predetermined gesture of the responder is detected based on the acquired recognition result (S51) (S52).

When the predetermined gesture of the responder is detected (YES in S52), the controller 50 transmits the re-notification to the operator terminal 4 corresponding to the operator W other than the responder, for example (S17). For example, in this processing, the controller 50 may transmit the re-notification including a captured image in which the predetermined gesture is detected. This allows the operator W receiving the re-notification with the operator terminal 4 displaying the captured image to check the responder.

When the predetermined gesture of the responder is not detected (NO in S52), the controller 50 proceeds to step S15.

According to the above processing, the movement detection processing for the responder is performed by the image recognition based on the image data from the camera 2-3 (S11A). Therefore, for example, even in a case where it is difficult to install a beacon transmitter 65 or the like in the workplace 6, the movement detection processing can be performed using the camera 2-3 that captures an image of the operator W moving in the workplace 6. For example, in a case where the predetermined gesture by the responder is detected by image recognition (S51) of the predetermined gesture based on image data from the camera 2-2 that captures an image the irregular equipment A2 (YES in S52), the re-notification is transmitted (S17). Therefore, when the responder cannot handle the irregular equipment A2, it is possible to call another operator W by the re-notification by performing the predetermined gesture, for example In the present embodiment, the operator terminal 4 may not generate and transmit position information to the notification server 5. When the irregular states of the pieces of equipment A1 and A2 are detected (S2 in FIG. 5), capturing a lamp or the like installed in each of the pieces of equipment A1 and A2 by a corresponding one of the cameras 2-1 and 2-2, the lamp indicating the operating state of each of the pieces of equipment A1 and A2, the operating state may be determined from the captured image without using any state information, for example. In the alert system 1A, the camera that images each of the pieces of equipment A1 and A2 is not limited to the cameras 2-1 and 2-2 and may be implemented by a camera that captures an image of the workplace 6 to recognize the position of the operator W similarly to the camera 2-3, for example. For example, the movement detection processing by image recognition (S11A) and image recognition of the predetermined gesture (S51) may be performed using a camera installed so as to capture the entire range in which the operator W moves in the workplace 6 without particularly using the cameras 2-1 and 2-2.

In the notification server 5 according to the present embodiment, the network I/F 55, which is an example of a communication interface, receives image data (an example of first image data) from the camera 2-3 as an example of a first imaging device that captures an image of the workplace

6, which is an example of the environment. In the present embodiment, the controller 50, which is an example of the position information obtainer, acquires the position information D41 to D43, based on the image data and acquires position information, by recognizing the position of each operator W (an example of each user) in the captured image indicated by the image data received from the camera 2-3 (S11A). This makes it possible to perform the movement detection processing using the position information based on the image data in the notification server 5 even when each operator terminal 4 does not generate and transmit pieces of position information D41 to D43 to the notification server 5.

In the present embodiment, the network I/F 55 (an example of a communication interface) receives image data (an example of second image data) from the camera 2-2 as an example of a second imaging device that captures an image of the equipment A2 as an example of the equipment in the irregular state. After transmitting the cancellation notification D6 (S13), the controller 50 detects, based on the image data received from the camera 2-2, a gesture of the operator W (an example of the user) as the responder included in the captured image indicated by the image data (S51). Upon detecting the predetermined gesture (YES in S52), the controller 50 transmits a re-notification indicating the cancellation of the cancellation notification D6 (S17). Therefore even in a case where the operator W as the responder arrives at the irregular equipment A2 but the irregular state cannot be resolved, the responder performs the predetermined gesture to prompt the transmission of the re-notification, and it is possible to secure another operator W to handle the irregular state, for example.

Other Embodiments

As described above, the first to fourth embodiments are described as examples of the technique disclosed in the present application. However, the technique in the present disclosure is not limited to be applied to the above embodiments and can be applied to embodiments in which changes, substitutions, additions, omissions, and the like are made as appropriate. It is also possible to combine the respective constituent elements described in each of the above embodiments into a new embodiment. Therefore, other embodiments will be exemplified below.

Each of the above embodiments exemplifies the notification server 5 that transmits notification information such as the irregularity notification D3 to the operator terminals 4 of all the operators W in the workplace 6 when performing notification to call the operator W to the irregular equipment A2 (S3, S17). In the present embodiment, the notification server 5 may transmit the notification information to only a part of the operator terminals 4. For example, the notification server 5 may transmit the notification information to the operator terminal 4 of the operator W located in a specific area in the workplace 6 based on the position information of the operator W. This makes it possible to perform selective notification such as not notifying the operator W in a conference room or notifying only the operator W within a predetermined range from the irregular equipment. This facilitates to suppress a decrease in work efficiency due to the excessive notification of calls.

Each of the above embodiments describes an example in which the notification server 5 transmits the cancellation notification D6 to the operator terminal 4 regardless of the number of responders when the movement of the responders is detected (YES in S12) (S13). In the present embodiment, the notification server 5 may transmit the cancellation notification D6 (S13) according to the number of responders. For example, in step S12, the controller 50 may proceed to step S13 only in a case where the movement of a predetermined number (e.g., two) or more of responders is detected and repeat the movement detection processing in a case where the number of the responders is less than the predetermined number.

The second embodiment described above exemplifies the example in which in the movement detection processing for the responder, it is determined whether or not the operator W is a qualified person based on the previously stored qualification information (S31). In the present embodiment, the alert system may include a camera installed to capture an image of the operator W, similarly to the camera 2-3 in the alert system 1A according to the fourth embodiment, for example. In the present embodiment, in step S31, the alert system may determine whether or not the operator W is a qualified person by recognizing characteristics, including the color of clothes of the operator W such as a hat or the presence or absence of an arm band, by image recognition based on image data from the camera. For example, in step S31, the controller 50 of the notification server 5 in the system may acquire image data from the camera and apply image recognition processing for recognizing the above characteristics.

Each of the above embodiments describes an example in which the notification server 5 performs the processing related to re-notification (S14 to S17) after transmitting the cancellation notification D6. In the present embodiment, the notification server 5 may not particularly execute the processing related to re-notification (S14 to S17).

Each of the above embodiments exemplifies the application of the alert system 1 or 1A to the workplace 6. In the present embodiment, a site to which the alert system 1 or 1A and the notification server 5 are applied is not particularly limited to the workplace 6 and may be various sites such as a distribution warehouse or a sales floor of a store.

As described above, the embodiments are described as examples of the technique disclosed in the present disclosure. For this purpose, the accompanying drawings and detailed description are provided.

Therefore, components in the accompanying drawings and the detailed description may include not only components essential for solving problems, but also components that are provided to illustrate the above technique and are not essential for solving the problems. Accordingly, such inessential components should not be readily construed as being essential based on the fact that such inessential components are shown in the accompanying drawings or mentioned in the detailed description.

Furthermore, since the embodiments described above are intended to illustrate the technique in the present disclosure, various changes, substitutions, additions, omissions, and the like can be made within the scope of the claims and the scope of equivalents thereof.

The present disclosure is applicable to various alert systems that alert, to a plurality of operators, information to prompt movement in various environments such as factories, distribution sites, and stores.

What is claimed is:

1. An alert device for alerting an irregularity for equipment to a plurality of users, the equipment being placed in an environment, the alert device comprising:
   a communication interface configured to perform data communication with a plurality of terminal devices respectively associated with the plurality of users;

a controller configured to control an operation of the communication interface to transmit and receive information;
   a state information obtainer configured to acquire state information indicating a state of the equipment; and
   a position information obtainer configured to acquire position information indicating a position of each user in the environment, wherein
   the controller is configured to,
      upon specifying that the equipment is in an irregular state based on the state information, transmit an irregularity notification to the plurality of terminal devices, the irregular state being a state of the equipment not operating properly, the irregularity notification indicating that the equipment is in the irregular state,
      after transmitting the irregularity notification, detect a moving user to the equipment in the irregular state among the plurality of users based on the position information, and
      when the moving user is detected, transmit a cancellation notification indicating cancellation of the irregularity notification to a part or all of the plurality of terminal devices to which the irregularity notification is transmitted.

2. The alert device according to claim 1, wherein the controller is configured to, when the moving user is detected, transmits the cancellation notification to a terminal device associated with a user other than the detected user, among the plurality of terminal devices to which the irregularity notification is transmitted.

3. The alert device according to claim 1, wherein the controller is configured to
   determine whether or not the irregular state is resolved during a predetermined period after transmitting the cancellation notification, and
   upon determining that the irregular state is not resolved, transmits a re-notification to a terminal device to which the cancellation notification is transmitted, the re-notification indicating cancellation of the cancellation notification.

4. The alert device according to claim 1, wherein the controller is configured to detect the moving user, based on the position information sequentially acquired by the position information obtainer, by calculating a change in a distance between each of the users and the equipment in the irregular state.

5. The alert device according to claim 1, further comprising
   a memory configured to store administrator information indicating an administrator who manages the equipment, among the plurality of users, wherein
   the controller is configured
      to transmit the cancellation notification when the moving user is the administrator for the equipment in the irregular state in the administrator information, and
      not to transmit the cancellation notification when the moving user is not the administrator for the equipment in the irregular state in the administrator information.

6. The alert device according to claim 5, wherein the administrator information manages, as the administrator, a user associated with a terminal device from which predetermined information is transmitted to the communication interface, based on information received by the communication interface from the plurality of terminal devices.

7. The alert device according to claim 1, wherein
the position information obtainer is configured to sequentially acquire the position information from each of the terminal devices associated with the users respectively.

8. The alert device according to claim 1, wherein
the communication interface is configured to receive first image data from a first imaging device configured to capture an image of the environment, and
the position information obtainer is configured to acquire the position information, based on the first image data received from the first imaging device, by recognizing a position of each user in a captured image indicated by the first image data.

9. The alert device according to claim 1, wherein
the communication interface is configured to receive second image data from a second imaging device configured to capture an image of the equipment in the irregular state, and
the controller is configured to
detect a gesture of the user included in a captured image indicated by the second image data, based on the second image data received from the second imaging device, after transmission of the cancellation notification, and
when a predetermined gesture is detected, transmit a re-notification indicating cancellation of the cancellation notification.

10. An alert system comprising:
the plurality of terminal devices respectively associated with the plurality of users; and
the alert device according to claim 1.

11. The alert system according to claim 10, wherein
each of the terminal devices includes
a terminal communication interface configured to perform data communication with the alert device,
a display configured to display information,
an operation interface configured to receive a user operation to set setting information including information indicating enablement or disablement of displaying a notification related to the equipment, and
a terminal controller configured to select, based on the setting information, whether or not to display the irregularity notification and the cancellation notification on the display.

12. An alert method for alerting an irregularity for equipment to a plurality of users, the equipment being placed in an environment, the alert method comprising:
by a communication interface of a computer, the communication interface being configured to perform data communication with a plurality of terminal devices respectively associated with the plurality of users, acquiring state information indicating a state of the equipment, and
acquiring position information indicating a position of each user in the environment, and
by a controller of the computer,
upon specifying that the equipment is in an irregular state based on the state information, transmitting an irregularity notification to the plurality of terminal devices, the irregular state being a state of the equipment not operating properly, the irregularity notification indicating that the equipment is in the irregular state,
detecting, after transmitting the irregularity notification, a moving user to the equipment in the irregular state among the plurality of users based on the position information, and
when the moving user is detected, transmitting a cancellation notification indicating cancellation of the irregularity notification to a part or all of the plurality of terminal devices to which the irregularity notification is transmitted.

13. A tangible non-transitory computer readable medium storing a program for causing a controller of a computer to execute the alert method according to claim 12.

14. The alert device according to claim 1, wherein
the controller is configured to:
detect the moving user in an approaching direction toward irregular equipment based on the position information, the irregular equipment being specified as the equipment in the irregular state; and
when the moving user in the approaching direction toward irregular equipment is detected, transmit the cancellation notification.

15. The alert device according to claim 14, wherein
the controller is configured to:
calculate a distance between each of the plurality of users and the irregular equipment based on the position information in a predetermined cycle at which the position information is acquired; and
detect the moving user in the approaching direction toward the irregular equipment according to a change in the distance calculated in the predetermined cycle.

16. The alert device according to claim 15, wherein
the controller is configured to, when the change reduces the distance from a specific user to the irregular equipment by a predetermined value or more among the plurality of users, detect the specific user as the moving user in the approaching direction toward the irregular equipment.

* * * * *